United States Patent
Zhang et al.

(10) Patent No.: US 9,807,630 B2
(45) Date of Patent: Oct. 31, 2017

(54) METHOD AND SYSTEM FOR COLLECTING TERMINAL MEASUREMENT DATA

(75) Inventors: Hongzhuo Zhang, Shanghai (CN); Lan Zou, Shanghai (CN); Lei Jin, Nanjing (CN); Xiaoli Shi, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 959 days.

(21) Appl. No.: 13/592,073

(22) Filed: Aug. 22, 2012

(65) Prior Publication Data
US 2012/0315949 A1    Dec. 13, 2012

Related U.S. Application Data

(63) Continuation of application No. PCT/CN2010/079887, filed on Dec. 16, 2010.

(30) Foreign Application Priority Data

Feb. 22, 2010 (CN) .......................... 2010 1 0116841

(51) Int. Cl.
*H04W 36/00* (2009.01)
*H04W 24/08* (2009.01)

(52) U.S. Cl.
CPC ............ *H04W 24/08* (2013.01); *H04W 36/00* (2013.01)

(58) Field of Classification Search
CPC ..... H04W 24/08; H04W 24/10; H04W 36/00; H04L 41/044
(Continued)

(56) References Cited

U.S. PATENT DOCUMENTS 8,768,335 B2 * 7/2014 Yi .................. H04W 24/10
455/422.1
2002/0137527 A1    9/2002 Iyer
(Continued)

FOREIGN PATENT DOCUMENTS

CN    1731879 A    2/2006
CN    1870532 A    11/2006
(Continued)

OTHER PUBLICATIONS

3rd Generation Partnership Project; Technical Specification Group Services and Aspects; Telecommunication management; Integration of device management information with ltf-N (Release 9), 3GPP TR 32.827 V0.4.0, Jan. 2010, 7 pages.
(Continued)

*Primary Examiner* — Mong-Thuy Tran

(57) ABSTRACT

The present invention discloses a method and system for collecting terminal measurement data, an integration reference point manager system, an integration reference point agent system, a home subscriber server, a mobility management entity, a NodeB and a user equipment. Specifically, an integration reference point agent (IRP Agent) receives a terminal measurement data start operation or terminal measurement data stop operation sent by an integration reference point manager (IRP Manager), where the terminal measurement data start operation is used to start terminal measurement data collection and carries configuration parameters used to collect terminal measurement data, and the terminal measurement data stop operation is used to instruct stop of terminal measurement collection. The present invention enables a terminal to collect and report terminal measurement data.

9 Claims, 15 Drawing Sheets

(58) Field of Classification Search
USPC ....... 455/436, 517, 515, 67.11, 68, 423, 437
See application file for complete search history.

(56) References Cited

U.S. PATENT DOCUMENTS

| | | | |
|---|---|---|---|
| 2005/0075099 A1* | 4/2005 | Guyot | 455/414.1 |
| 2005/0276244 A1 | 12/2005 | Gronberg et al. | |
| 2006/0084390 A1* | 4/2006 | Salonaho | H04W 36/30 455/67.11 |
| 2006/0217154 A1* | 9/2006 | Fauconnier et al. | 455/560 |
| 2007/0111748 A1* | 5/2007 | Risbood | H04W 24/06 455/550.1 |
| 2007/0197206 A1* | 8/2007 | Olson | H04L 12/2697 455/423 |
| 2007/0226701 A1 | 9/2007 | Suonvieri et al. | |
| 2008/0009279 A1 | 1/2008 | Sakawa | |
| 2009/0129342 A1* | 5/2009 | Hwang et al. | 370/331 |
| 2009/0135731 A1* | 5/2009 | Secades | H04W 24/10 370/252 |
| 2009/0233611 A1* | 9/2009 | Olsson et al. | 455/446 |
| 2009/0312001 A1 | 12/2009 | Bodog | |
| 2009/0323965 A1* | 12/2009 | Kenehan et al. | 380/278 |
| 2010/0041412 A1* | 2/2010 | Yu | 455/450 |
| 2010/0165862 A1* | 7/2010 | Nylander et al. | 370/252 |
| 2010/0190488 A1* | 7/2010 | Jung | H04W 24/10 455/424 |
| 2011/0195707 A1* | 8/2011 | Faerber | H04W 24/08 455/423 |
| 2011/0201279 A1* | 8/2011 | Suzuki | H04W 24/10 455/67.11 |
| 2011/0211504 A1* | 9/2011 | Feuersanger et al. | 370/310 |
| 2011/0222511 A1 | 9/2011 | Weng et al. | |
| 2012/0015657 A1* | 1/2012 | Comsa | H04W 36/0094 455/436 |
| 2012/0282968 A1* | 11/2012 | Toskala | H04W 24/10 455/517 |
| 2012/0309431 A1* | 12/2012 | Bodog | 455/456.6 |
| 2012/0315949 A1 | 12/2012 | Zhang | |

FOREIGN PATENT DOCUMENTS

| | | |
|---|---|---|
| CN | 101051933 A | 10/2007 |
| CN | 101064639 A | 10/2007 |
| CN | 101370228 A | 2/2009 |
| CN | 101405992 A | 4/2009 |
| CN | 101925106 A | 12/2010 |
| CN | 101931984 A | 12/2010 |
| CN | 102056216 A | 5/2011 |
| EP | 1 814 255 A1 | 1/2007 |
| JP | 2008022065 A | 1/2008 |
| RU | 2368107 C2 | 9/2009 |
| RU | 2409896 C2 | 1/2011 |
| RU | 2010139425 A | 4/2012 |
| WO | WO 2008/105687 A1 | 9/2008 |
| WO | 2008125547 A1 | 10/2008 |
| WO | 2009154640 A2 | 12/2009 |
| WO | 2010053727 A2 | 5/2010 |
| WO | WO 2010/145531 A1 | 12/2010 |
| WO | 2011100884 A1 | 8/2011 |

OTHER PUBLICATIONS

3rd Generation Partnership Project; Technical Specification Group Services and System Aspects; Telecommunication management; Subscriber and equipment trace; Trace control and configuration management (Release 9) 3GPP TS 32.422 v9.0. 1, Jan. 2010, 6 pages.
Notice of Reasons for Rejection received in Application No. 2012-554197 mailed Oct. 22, 2013, 9 pages. (Partial Translation).
Rejection Decision received in Chinese Application No. 201010116841.0, Applicant: Huawei Technologies Co., Ltd., mailed Apr. 2, 2013, 15 pages. (Partial Translation).
Chinese Office Action and Translation received in Chinese Application No. 201010116841.0, mailed Jun. 18, 2012, 9 pages.
Chinese Search Report received in Chinese Application No. 201010116841.0, mailed Jun. 18, 2012, 8 pages.
International Search Report and Translation received in Patent Cooperation Treaty Application No. PCT/CN2010/079887, mailed Mar. 31, 2011, 6 pages.
Written Opinion of the International Searching Authority and Translation received in Patent Cooperation Treaty Application No. PCT/CN2010/079887, mailed Mar. 31, 2011, 11 pgs.
3GPP TS 32.422, Technical Specification, vol. 9.0.1, Jan. 2010, pp. 1-82.
Toche, Christian, "3GPP SA5 OAM&P and Charging Standards" International Telecommunication Union, Huawei Technologies 3GPP SA5 Chair, May 22-23, 2006, pp. 1-30.
Extended European Search Report received in Application No. 10846006.4-1249 mailed Jan. 25, 2013; Applicant: Huawei Technologies Co., Ltd., 6 pages.
Second Chinese Office Action of Chinese Application No. 201010116841.0, mailed Nov. 23, 2012, 13 pages.
3GPP TSG-RAN WG2 #66 R2-092820,"Necessary measurements for minimising drive tests", TeliaSonera, T-Mobile, May 4-8, 2009, total 4 pages.
3GPP TR 36.805 V2.0.0,3rd Generation Partnership Project;Technical Specification Group Radio Access Network; Study on Minimization of drive-tests in Next Generation Networks; (Release 9),Dec. 2009,total 23 pages.
3GPP TSG-SA5 (Telecom Management) S5-100489r1,"New WI proposal for Management of UE based network performance measurements",Huawei, Orange,Jan. 18-22, 2010,total 7 pages.
3GPP TSG-RAN WG2 Meeting #68 R2-097020,"Architectures comparison",Nokia Siemens Networks, Nokia Corporation,Nov. 9-13, 2009,total 7 pages.

* cited by examiner

METHOD AND SYSTEM FOR COLLECTING TERMINAL MEASUREMENT DATA

CROSS-REFERENCE TO RELATED APPLICATIONS

This application is a continuation of International Application No. PCT/CN2010/079887, filed on Dec. 16, 2010, which claims priority to Chinese Patent Application No. 201010116841.0, filed on Feb. 22, 2010, both of which are hereby incorporated by reference in their entireties.

FIELD OF THE INVENTION

The present invention relates to the field of communications, and in particular, to a method and system for collecting terminal measurement data.

BACKGROUND OF THE INVENTION

In some communication systems, for example, global system for mobile communications (GSM, Global System for Mobile Communications), wideband code division multiple access (WCDMA, Wideband Code Division Multiple Access), code division multiple access (CDMA, Code Division Multiple Access), and worldwide interoperability for microwave access (Wimax, Worldwide Interoperability for Microwave Access), to ensure normal communication over the network, some data, for example, network element data, need be collected.

The universal mobile telecommunication system (UMTS, Universal Mobile Telecommunication System) is a third generation mobile communication system that adopts the WCDMA air interface technology. The UMTS system is usually called the WCDMA communication system.

For example, FIG. 1 is a schematic structural diagram of a UMTS in the prior art. The universal mobile telecommunication system (UMTS, Universal Mobile Telecommunication System) adopts a structure similar to a second generation mobile communication system, including a radio access network (Radio Access Network, RAN) and a core network (Core Network, CN). The radio access network processes all radio-related functions and the CN processes all voice calls and data connections in the UMTS system and implements functions of switching and routing with external networks. Logically, the CN is divided into a circuit switched domain (Circuit Switched Domain, CS) and a packet switched domain (Packet Switched Domain, PS).

The core network CN includes an MSC/VLR, a serving GPRS support node (SGSN, Serving GPRS Support Node), an HLR, a gateway mobile-services switching centre (GMSC, Gateway Mobile-services Switching Centre), and a gateway GPRS support node (GGSN, Gateway GPRS Support Node). The core network may be connected to an external network (External Network) through the GMSC or GGSN. For example, the core network may be connected to a public land mobile network (PLMN, Public Land Mobile Network), a public switched telephone network (PSTN, Public Switched Telephone Network), or an integrated services digital network (ISDN, Integrated Services Digital Network) through the GMSC; and may be connected to the Internet INTERNET through the GGSN.

The UMTS system includes a universal terrestrial radio access network (UTRAN, Universal Terrestrial Radio Access Network), a CN, and a user equipment (User Equipment, UE).

FIG. 2 is a schematic structural diagram of a UTRAN in the prior art. The UTRAN is a terrestrial radio access network and includes one or more radio network subsystems (RNS, Radio Network Subsystem). An RNS includes one radio network controller (RNC, Radio Network Controller) and one or more base stations (NodeB). The interface between the RNC and CN is an Iu interface, and the NodeB and RNC are connected through an Iub interface. Within the UTRAN, radio network controllers (RNC) are interconnected through an Iur interfasce which implements connection by using direct physical connection between the RNCs or by using a transport network. RNC allocates and controls radio resources of the NodeB connected or related to the RNC. The NodeB implements conversion of data streams between the Iub interface and a Uu interface and also partially manages the radio resources.

The NodeB is a base station (or a radio transceiver) in a WCDMA system, including a radio transceiver and a baseband processing unit. The NodeB interconnects with the RNC through a standard Iub interface and mainly implements physical layer protocol processing of the Uu interface. The main functions of the NodeB include spectrum spreading, modulation, channel coding and de-spreading, demodulation, and channel decoding, as well as mutual conversions between baseband signals and radio frequency signals.

The RNC is a radio network controller that controls radio resources of the UTRAN. The RNC mainly implements such functions as connection setup and disconnection, handover, macro diversity combination, and radio resource management control.

To maintain the competitiveness of future networks, the 3GPP puts forward a brand-new network evolution architecture to meet the application requirements on the mobile network in the coming ten years or even longer, which includes system architecture evolution (SAE, system architecture evolution) and long term evolution (LTE, Long Term Evolution) of the access network. The evolved access network is named evolved universal terrestrial radio access network (E-UTRAN, Evolved Universal Terrestrial Radio Access Network). The goal of network evolution is to provide an all-IP network with small delay, high data rate, large system capacity, wide coverage, and low cost. Because this is a brand-new network architecture, all nodes, functions, and procedures under the current architecture are subject to substantive changes.

An evolved packet core network architecture may be shown in FIG. 3, including three logical function entities, namely, a mobility management entity (Mobility Management Entity, MME), a serving SAE gateway (Serving SAE GW), and a packet data network SAE gateway (PDN (Packet Data Network) SAE GW).

The MME is responsible for mobility management on a control plane, including user context and mobility state management and temporary user identity allocation, corresponding to a control plane of a serving GPRS support node (SGSN) in a current GPRS/UMTS system.

The Serving SAE GW is responsible for initiating paging to downlink data in an idle state and managing and storing IP bearer parameters and intra-network routing information, corresponding to a data plane of the SGSN and a gateway GPRS support node (GGSN, Gateway GPRS Support Node) in the current GPRS/UMTS system.

The PDN SAE GW serves as a user plane anchor point between different access systems.

The policy and charging rule function entity (Policy and Charging Rule Function, PCRF) is used for policy control and decision and stream charging control.

The home subscriber server (Home Subscriber Server, HSS) is used to store user subscription information.

A network structure of the E-UTRAN is shown in FIG. 4, where a mobility management entity (Mobility Management Entity, MME) and an eNB are connected through an S1-MME interface, a serving SAE gateway (Serving SAE GW) and an eNB are connected through an S1-U interface, and two eNBs are connected through an X2 interface.

Conventional network optimization is based on drive test data. A drive tester is used to collect data such as level and quality of a network and the data is analyzed to find out problems related to coverage, capacity, QoS, and mobility of the network. In this way, network optimization is implemented specifically to the affected areas.

When the network scale grows constantly, it becomes increasingly harder to implement network optimization relying on experience only. Moreover, due to the constraint of the drive test route, the drive test data may not uncover all network problems. Accordingly, operators require automatic network optimization. Automatic network optimization is capable of minimizing the OPEX of an operator, maximizing network utilization at the lowest equipment cost, reducing the experience requirement and dependence on the network optimization personnel, and relieving the work load of the network optimization personnel.

To reduce conventional drive tests which require a large proportion of manual work and to collect data more effectively, the 3GPP is studying a substitution of automatic report of network optimization required parameters by ordinary commercial terminals for the conventional manual collection of drive test data (terminal measurement data). This automatic report of terminal measurement data by ordinary commercial terminals may be used as a basic method of MDT (Minimization of drive test, minimization of drive test) to collect the drive test data (terminal measurement data).

FIG. 5 is a schematic flowchart of a user equipment tracing method in the prior art. An element management system (EMS, Element Management System) may broadcast parameter configurations to trace to all network element nodes in the system so as to implement signaling trace on a specific user or device.

The network element nodes in the network send recorded trace data to a Trace data collecting entity. After the entity collects signaling trace data of a specific user, faults and problems in the network may be assessed and diagnosed according to analysis of the trace data.

501. An EMS sends a Trace Session Activation (Trace Session Activation) message to an HSS or an MME.

The Trace Session Activation message is used to trigger a signaling trace procedure for a specific user or device, and carries trace configuration parameters including international mobile subscriber identity (IMSI, International Mobile Subscriber Identity) or international mobile equipment identity (IMEI), trace reference (Trace Reference Identity), triggering events (Triggering events), trace depth (Trace Depth), list of NE types to trace (List of NE types to trace), list of interfaces (List of Trace Interfaces), and IP address of trace collection entity (IP address of Trace Data Collection Entity).

502-504. The HSS stores the trace configuration parameters. When a user to trace accesses the network, the user sends an Attach Request (Attach Request) to the network, and sends an Update Location Request (Update Location Request) to the HSS to update its location information.

505. The HSS checks whether the user needs tracing, and if yes, sends the trace configuration parameters to the MME by using an Update Location Answer (Update Location Answer).

506. The MME stores the trace configuration parameters, initiates a trace logging session specific to the user, and sends the trace configuration parameters to an eNodeB by using an Initial Context Setup Request (Initial Context Setup Request).

The eNodeB stores the trace configuration parameters and initiates the trace logging session specific to the user.

This method, however, only implements user-specific signaling data trace for network elements on the network side and may not implement collection and analysis of data on a user terminal. This limits the effects of network fault assessment and diagnosis, and may not evaluate the radio environment where the user is located. As a result, possible problems in network coverage, capacity, QoS and mobility may not be detected.

SUMMARY OF THE INVENTION

Embodiments of the present invention provide a method and system for collecting terminal measurement data, an integration reference point manager system, an integration reference point agent system, a home subscriber server, a mobility management entity, a NodeB, and a user equipment, which enable a terminal to collect and report terminal measurement data so that a network analyzes the terminal measurement data reported by the terminal.

In one aspect, the present invention discloses a method for collecting terminal measurement data, including:

receiving, by an integration reference point agent (IRP Agent), a terminal measurement data start operation or terminal measurement data stop operation sent by an integration reference point manager (IRP Manager), where the terminal measurement data start operation is used to start terminal measurement data collection and carries configuration parameters used to collect terminal measurement data, and the terminal measurement data stop operation is used to instruct stop of terminal measurement data collection.

In another aspect, the present invention discloses a system for collecting terminal measurement data, including an integration reference point manager (IRP Manager) and an integration reference point agent (IRP Agent), where:

the IRP Manager is configured to send a terminal measurement data start operation or terminal measurement data stop operation to the IRP Agent, where the terminal measurement data start operation is used to start terminal measurement data collection and carries configuration parameters used to collect terminal measurement data, and the terminal measurement data stop operation is used to instruct stop of terminal measurement data collection; and the IRP Agent is configured to notify, over a network, a UE of initiating terminal measurement data collection or terminating terminal measurement data collection.

In still another aspect, the present invention discloses an integration reference point manager system, including:

an integration reference point manager (IRP Manager), configured to configure configuration parameters used to collect terminal measurement data or a terminal measurement stop indicator; and a sending unit, configured to send a terminal measurement data start operation or terminal measurement data stop operation to an IRP Agent, where the terminal measurement data start operation is used to start terminal measurement data collection and carries the configuration parameters used to collect terminal measurement data, and the terminal measurement data stop operation is used to instruct stop of terminal measurement data collection and carries the terminal measurement stop indicator, so that the IRP Agent sends the configuration parameters used to collect terminal measurement data or the terminal measurement stop indicator to a UE.

In still another aspect, the present invention discloses an integration reference point agent system, including:

a receiving unit, configured to receive a terminal measurement data start operation or terminal measurement data stop operation sent by an IRP Manager, where the terminal measurement data start operation is used to start terminal measurement data collection and carries configuration parameters used to collect terminal measurement data, and the terminal measurement data stop operation is used to instruct stop of terminal measurement data collection; and an integration reference point agent (IRP Agent), configured to notify, over a network, a UE of initiating terminal measurement data collection or terminating terminal measurement data collection.

In still another aspect, the present invention discloses a home subscriber server, including:

a receiving unit, configured to receive a Trace Session Activation or Trace Session Deactivation message sent by an IRP Agent, where the Trace Session Activation message is used to trigger a signaling trace procedure for a specific user or device and carries configuration parameters used to collect terminal measurement data, and the Trace Session Deactivation message carries a terminal measurement stop indicator used to instruct termination of terminal measurement data collection; and a sending unit, configured to send the configuration parameters used to collect terminal measurement data or the terminal measurement stop indicator to a UE through an MME or SGSN.

In still another aspect, the present invention discloses a mobility management entity, including:

a receiving unit, configured to receive configuration parameters used to collect terminal measurement data or a terminal measurement stop indicator sent by an IRP Agent; and a sending unit, configured to send the configuration parameters used to collect terminal measurement data or the terminal measurement stop indicator to a UE through a NodeB.

In still another aspect, the present invention discloses a NodeB, including:

a receiving unit, configured to receive configuration parameters used to collect terminal measurement data or a terminal measurement stop indicator sent by an IRP Agent, and receive a terminal measurement data report returned by a UE; and a sending unit, configured to send the configuration parameters used to collect terminal measurement data or the terminal measurement stop indicator to the UE, and send the terminal measurement data report returned by the UE to a trace data collection entity.

In still another aspect, the present invention discloses a user equipment, including:

a transceiver, configured to receive configuration parameters used to collect terminal measurement data or a terminal measurement stop indicator sent by a NodeB, and send a terminal measurement data report to the NodeB; and a measuring unit, configured to measure terminal measurement data according to the configuration parameters used to collect terminal measurement data, or terminate measurement of the terminal measurement data according to the terminal measurement stop indicator.

The above technical solutions enable a terminal to collect and report terminal measurement data, and a network analyzes the terminal measurement data reported by the terminal, so that problems related to coverage, capacity, QoS, and mobility in the network may be more accurately detected and located.

BRIEF DESCRIPTION OF THE DRAWINGS

To better explain the technical solutions of the present invention, the accompanying drawings required in the description of the embodiments of the invention are briefly described. It is apparent that the accompanying drawings illustrate only some exemplary embodiments of the invention. Persons of ordinary skill in the art may derive other drawings from these drawings without any creative effort. Among the drawings.

DETAILED DESCRIPTION OF THE EMBODIMENTS

For purposes of description rather than limitation, details of specific system structures, interfaces, and techniques are provided for thorough understanding of the present invention. Persons skilled in the art are clear that the present invention may be implemented in other embodiments even without such details. In other circumstances, detailed descriptions of commonly known apparatuses, circuits, and methods will not be provided, so that the description of the present invention is not hindered by unnecessary details.

The technical solutions of the present invention are applicable to all types of communication systems, such as GSM, Code Division Multiple Access (CDMA, Code Division Multiple Access) system, TDS-CDMA, CDMA2000, Wimax, Wideband Code Division Multiple Access (WCDMA, Wideband Code Division Multiple Access), General Packet Radio Service (GPRS, General Packet Radio Service), and Long Term Evolution (LTE, Long Term Evolution). A mobile terminal (Mobile Terminal), also called a mobile user (UE, User Equipment) or a mobile user equipment, may communicate with one or more core networks over a radio access network (such as RAN, Radio Access Network). The mobile terminal may be a mobile station such as a mobile phone (or a cellular phone) and a mobile terminal equipped computer such as a portable, pocket, handheld, computer embedded, or vehicle mounted mobile device, which exchange voices and/or data with the radio access network.

For ease of description, an LTE is used as an example for detailed illustration of the embodiments as follows.

Figure 1:
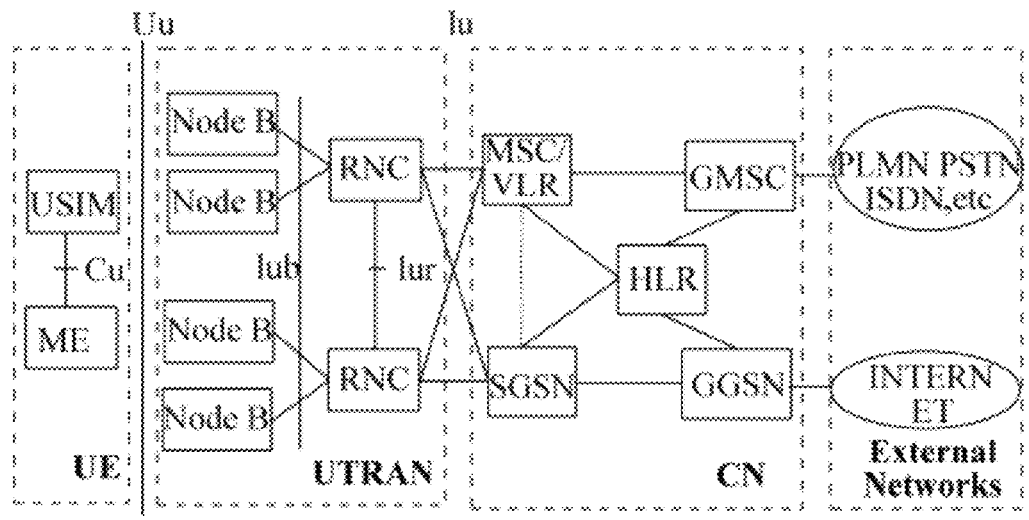
FIG. 1 is a schematic structural diagram of a UMTS in the prior art.
Figure 2:
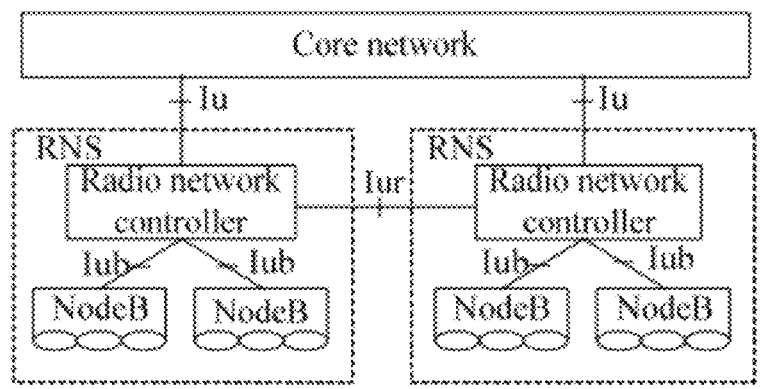
FIG. 2 is a schematic structural diagram of a UTRAN in the prior art.
Figure 3:
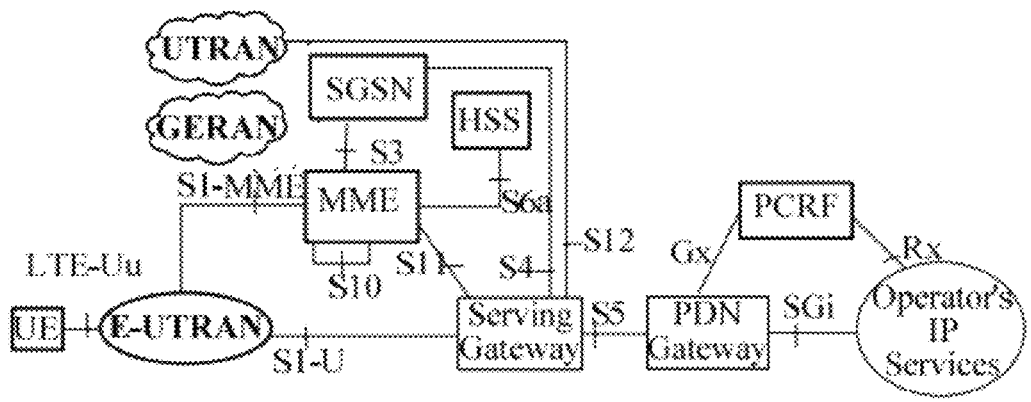
FIG. 3 is a schematic architectural diagram of an evolved packet core network in the prior art.
Figure 4:
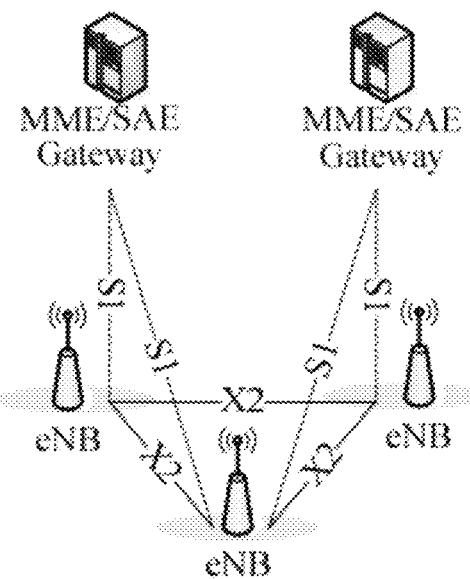
FIG. 4 is a schematic structural diagram of an E-UTRAN in the prior art.
Figure 5:
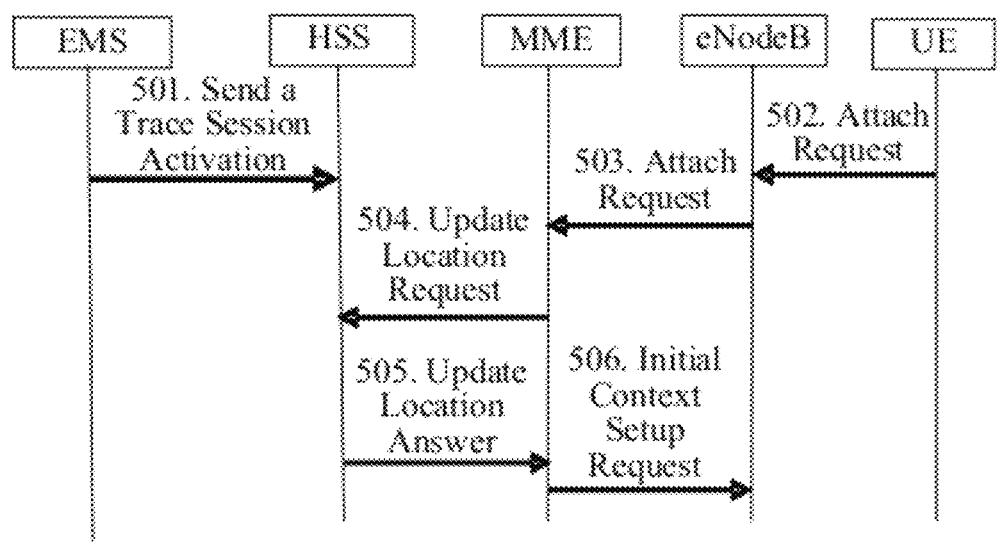
FIG. 5 is a schematic flowchart of a user equipment tracing method in the prior art.
Figure 6:
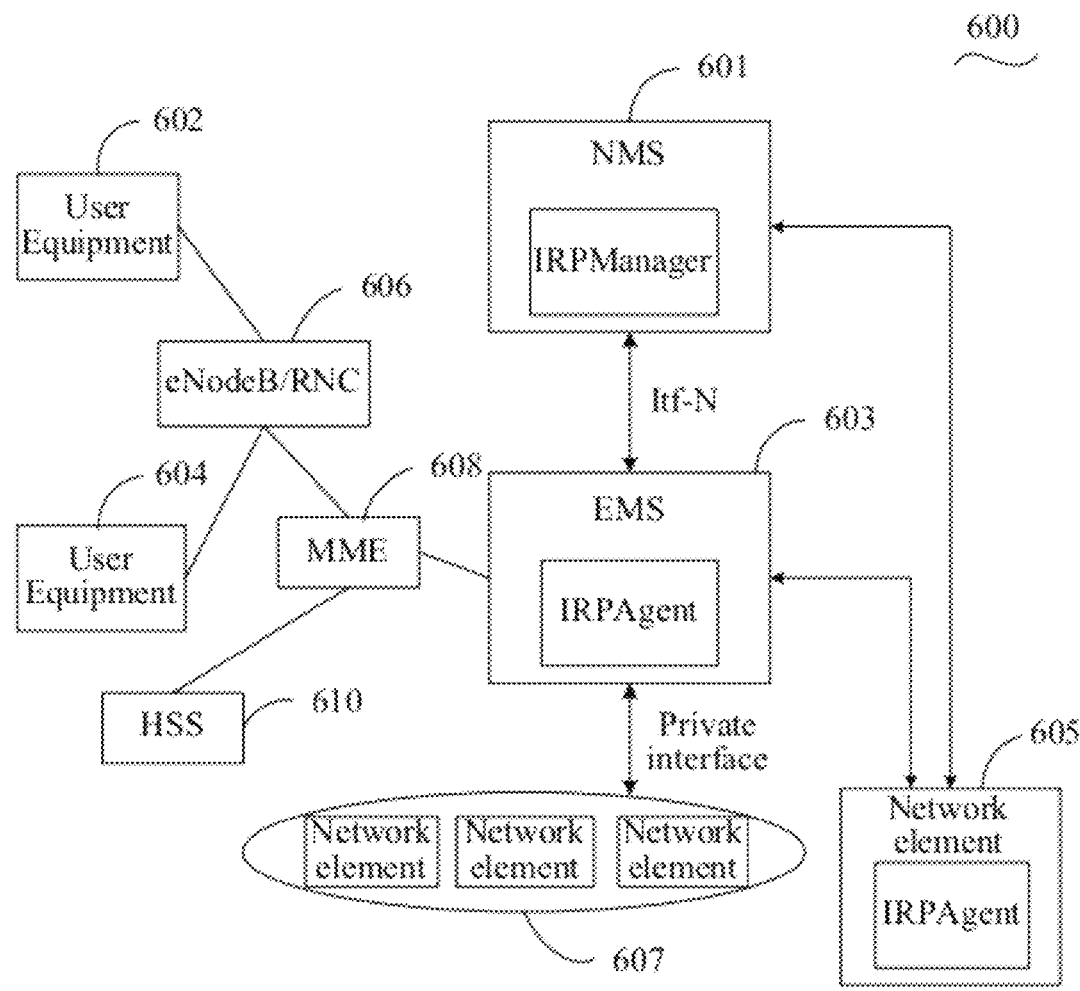
FIG. 6 is a brief schematic diagram of a system 600 for collecting terminal measurement data according to an embodiment of the present invention.

FIG. 6 is a brief schematic diagram of a system 600 for collecting terminal measurement data according to an embodiment of the present invention. The system 600 includes a network management system (NMS, Network Management System) 601, an element management system (EMS, Element Management System) 603, a network element (NE, Network Element) 605, an eNodeB/RNC 606, an MME 608, a network element 607, and an HSS 610.

The NMS 601 is connected to the EMS 603 and the network element 605. The EMS 603 is connected to the network element 605 and the network element 607.

Both a user equipment 602 and a user equipment 604 may be communicatively connected to the MME 608 through the eNodeB/RNC 606. The MME 608 is also communicatively connected to the HSS 610.

The NMS 601 is communicatively connected to the MME 608 through the EMS 603. In an EUTRAN or UTRAN network, network elements in the wireless network may be managed uniformly by the network management system 601. For example, the NMS 601 includes an integration reference point manager (Integration Reference Point Manager, IRP Manager), which is communicatively connected to the integration reference point agent (Integration Reference Point Agent, IRP Agent) of the network element 605 and is connected to the integration reference point agent (Integration Reference Point Agent, IRP Agent) of the EMS 603 through an itf-n interface. The IRP Agent of the EMS 603 is communicatively connected to the network element 607. The NMS 601 controls the network element 605 and the network element 607 through the IRP Manager.

The NMS 601 is configured to send a terminal measurement data start operation or terminal measurement data stop operation to the EMS 603, where the terminal measurement data start operation is used to start terminal measurement data collection and carries configuration parameters used to collect terminal measurement data, and the terminal measurement data stop operation is used to instruct stop of terminal measurement data collection and carries a terminal measurement stop indicator.

The EMS 603 is configured to send the configuration parameters used to collect terminal measurement data or the terminal measurement stop indicator to the UE, for example, the user equipment 602 or the user equipment 604 over the network, so that the UE initiates terminal measurement data collection according to the configuration parameters used to collect terminal measurement data or terminates terminal measurement data collection according to the terminal measurement stop indicator.

Figure 7:
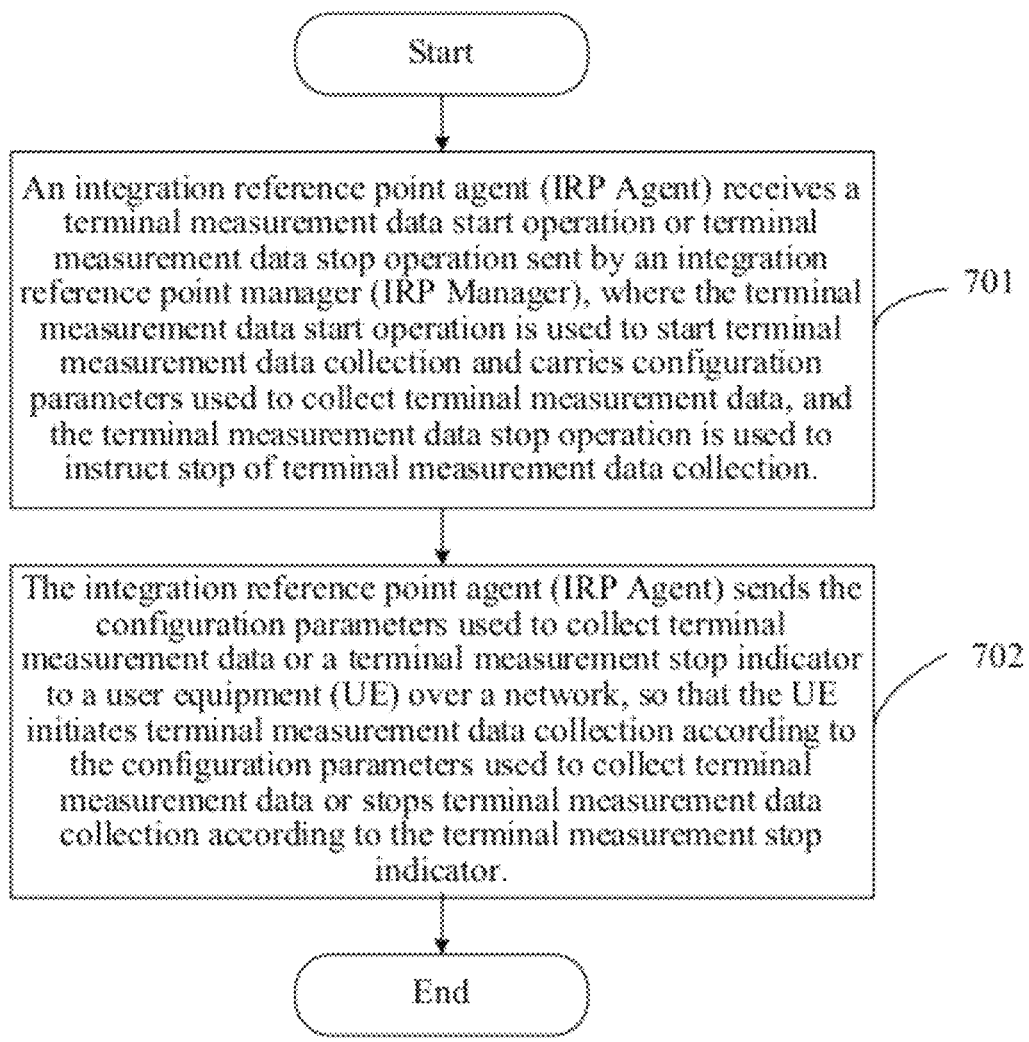
FIG. 7 is a schematic flowchart of a method for collecting terminal measurement data according to another embodiment of the present invention.

FIG. 7 is a schematic flowchart of a method for collecting terminal measurement data according to another embodiment of the present invention, including:

701. An integration reference point agent (IRP Agent) receives a terminal measurement data start operation or terminal measurement data stop operation sent by an integration reference point manager (IRP Manager), where the terminal measurement data start operation is used to start terminal measurement data collection and carries configuration parameters used to collect terminal measurement data, and the terminal measurement data stop operation is used to instruct stop of terminal measurement data collection.

Optionally, the terminal measurement data stop operation may carry a terminal measurement stop indicator.

702. The integration reference point agent (IRP Agent) sends the configuration parameters used to collect terminal measurement data or the terminal measurement stop indicator to a user equipment (UE) over a network, so that the UE initiates terminal measurement data collection according to the configuration parameters used to collect terminal measurement data or stops terminal measurement data collection according to the terminal measurement stop indicator.

When the terminal measurement data stop operation does not carry a terminal measurement stop indicator, the integration reference point agent (IRP Agent) notifies the UE of stopping terminal measurement data collection according to the terminal measurement data stop operation.

When the terminal measurement data stop operation carries a terminal measurement stop indicator, the details are as follows.

For example, the IRP Agent sends the configuration parameters used to collect terminal measurement data or the terminal measurement stop indicator to the UE through a home subscriber server (HSS), or mobility management entity (MME), or serving GPRS support node (SGSN), or mobile switching center (MSC), or NodeB, or radio network controller to initiate a terminal measurement data collection procedure.

For example, the IRP Agent sends a Trace Session Activation or Trace Session Deactivation message to the home subscriber server (HSS), or MME, or SGSN, or MSC, or NodeB, or radio network controller, where the Trace Session Activation message carries the configuration parameters used to collect terminal measurement data, and the Trace Session Deactivation message carries the terminal measurement stop indicator.

In another embodiment of the present invention, the IRP Manager also sends a List Activated Trace Jobs (ListActivatedTraceJobs) operation to the IRP Agent; and the IRP Agent outputs the number of terminals that are carrying out measurement.

The HSS sends to the IRP Agent a Trace Session Activation Response which carries a cause value indicating that the UE location is unknown, or the UE is detached, or the UE is idle. The IRP Agent sends to the IRP Manager the Trace Session Activation Response which carries a cause value indicating that the UE location is unknown, or the UE is detached, or the UE is idle.

According to the above technical solution, control commands of terminal measurement data configuration can be delivered, and terminal measurement data can be collected from network elements and user equipments. The collected terminal measurement data may be used to reflect the signal coverage status in an area and used as a reference for adjusting network planning and network optimization parameters.

Figure 8:
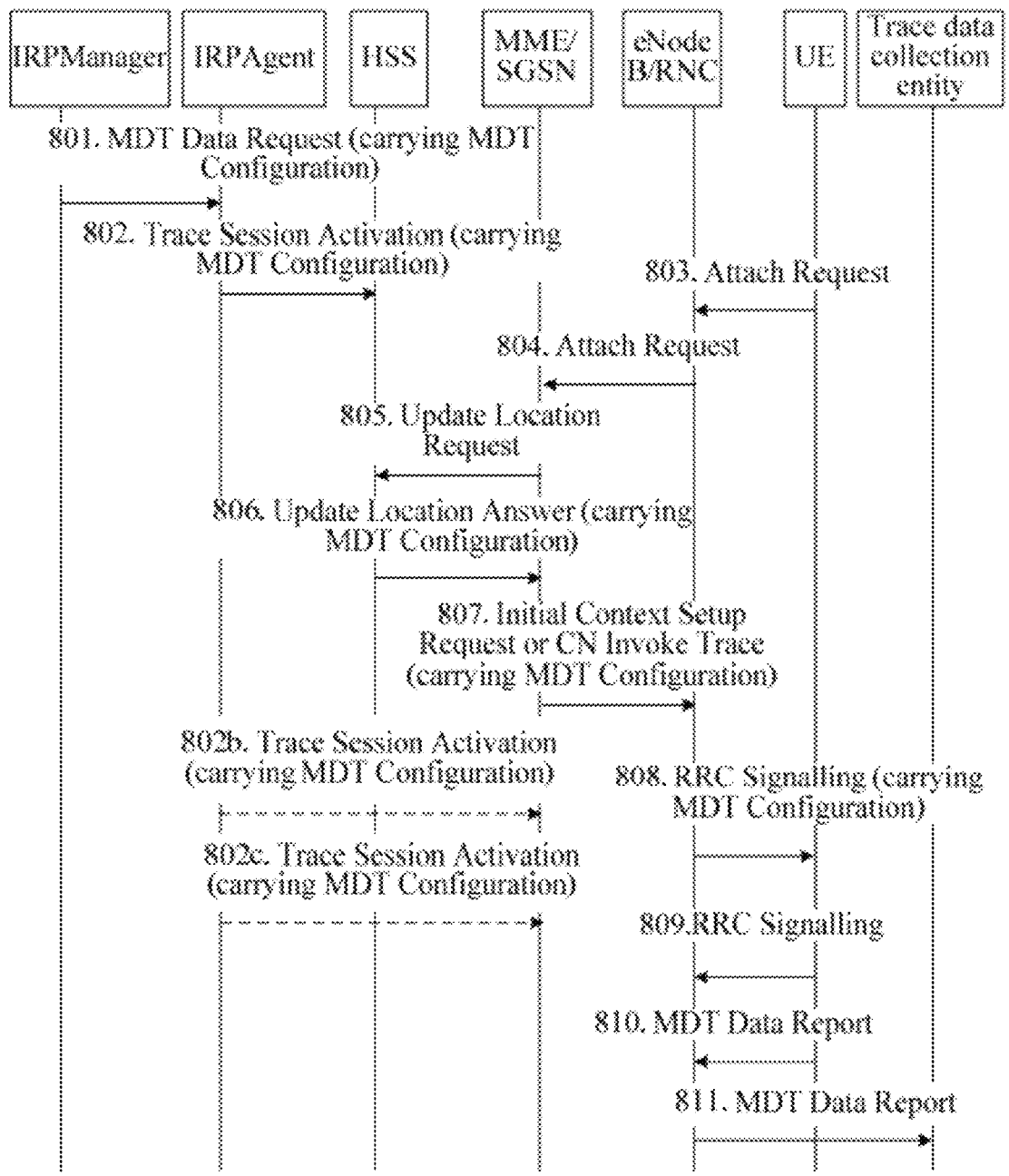
FIG. 8 is a schematic flowchart of a method for collecting terminal measurement data according to another embodiment of the present invention.

FIG. 8 is a schematic flowchart of a method for collecting terminal measurement data according to another embodiment of the present invention, which is a process of collecting measurement data of a single user terminal based on a signaling trace procedure and describes a transfer process of MDT configuration before a UE accesses a network.

801. An IRP Manager sends a terminal measurement data start operation (MDT Data Request) to an IRP Agent.

The terminal measurement data start operation is used to start terminal measurement data collection and carries configuration parameters (MDT Configuration) used to collect terminal measurement data.

For example, the terminal measurement data start operation may be an Active Trace Job (Active Trace Job) message of a trace northbound interface (trace IRP); or a Create Measurement Job (CreateMeasurementJob) message of a performance management northbound interface (PMIRP); or a message of a terminal measurement data collection northbound interface (MDTRP).

802. The IRP Agent sends a Trace Session Activation (Trace Session Activation) message to an HSS.

The Trace Session Activation message is used to trigger a signaling trace procedure for a specific user or device and carries the configuration parameters (MDT Configuration) used to collect terminal measurement data.

Optionally, the HSS stores trace configuration parameters and the configuration parameters used to collect terminal measurement data.

In another embodiment of the present invention, the IRP Agent may send the Trace Session Activation (Trace Session Activation) message to an MME/SGSN (802*b*) or an eNodeB/RNC (802*c*), where the Trace Session Activation message carries the configuration parameters (MDT Configuration) used to collect terminal measurement data. For ease of description, in this embodiment, the IRP Agent sends the Trace Session Activation (Trace Session Activation) message to the HSS, which is taken as an example for illustration.

803-805. When a user to trace accesses the network, the user sends an Attach Request (Attach Request) to the network and meanwhile updates its location information with the HSS.

806. The HSS checks whether the user needs tracing, and if yes, sends the configuration parameters used to collect terminal measurement data to the MME or SGSN (MME/SGSN hereinafter for ease of description) by using an Update Location Answer (Update Location Answer).

807. The entity receiving the configuration parameters used to collect terminal measurement data, for example, the MME/SGSN, initiates a trace logging session specific to the user, and meanwhile sends the configuration parameters used to collect terminal measurement data to the eNodeB by using an Initial Context Setup Request (Initial Context Setup Request) or a CN Invoke Trace (CN Invoke Trace) message.

Optionally, the MME further stores the configuration parameters used to collect terminal measurement data.

808. The eNodeB initiates a trace logging session specific to the user by sending Radio Resource Control Signaling (RRC Signalling) to the UE.

The eNodeB sends the configuration parameters used to collect terminal measurement data to the UE, instructing the UE to measure the terminal measurement data.

Optionally, the eNodeB further stores the configuration parameters used to collect terminal measurement data.

809. The UE sends a terminal measurement data configuration complete message to the eNodeB. This step is optional.

810-811. The UE sends a terminal measurement data report (MDT Data Report) to the eNodeB, and the eNodeB forwards the report to a trace data collection entity.

In another embodiment of the present invention, the trace data collection entity may be located in the IRP Agent, and the IRP Agent may further send the terminal measurement data report to the IRP Manager.

According to the above technical solution, control commands of terminal measurement data configuration can be delivered, and terminal measurement data can be collected from network elements and user equipments. The collected terminal measurement data may be used to reflect the signal coverage status in an area and used as a reference for adjusting network planning and network optimization parameters.

Figure 9:
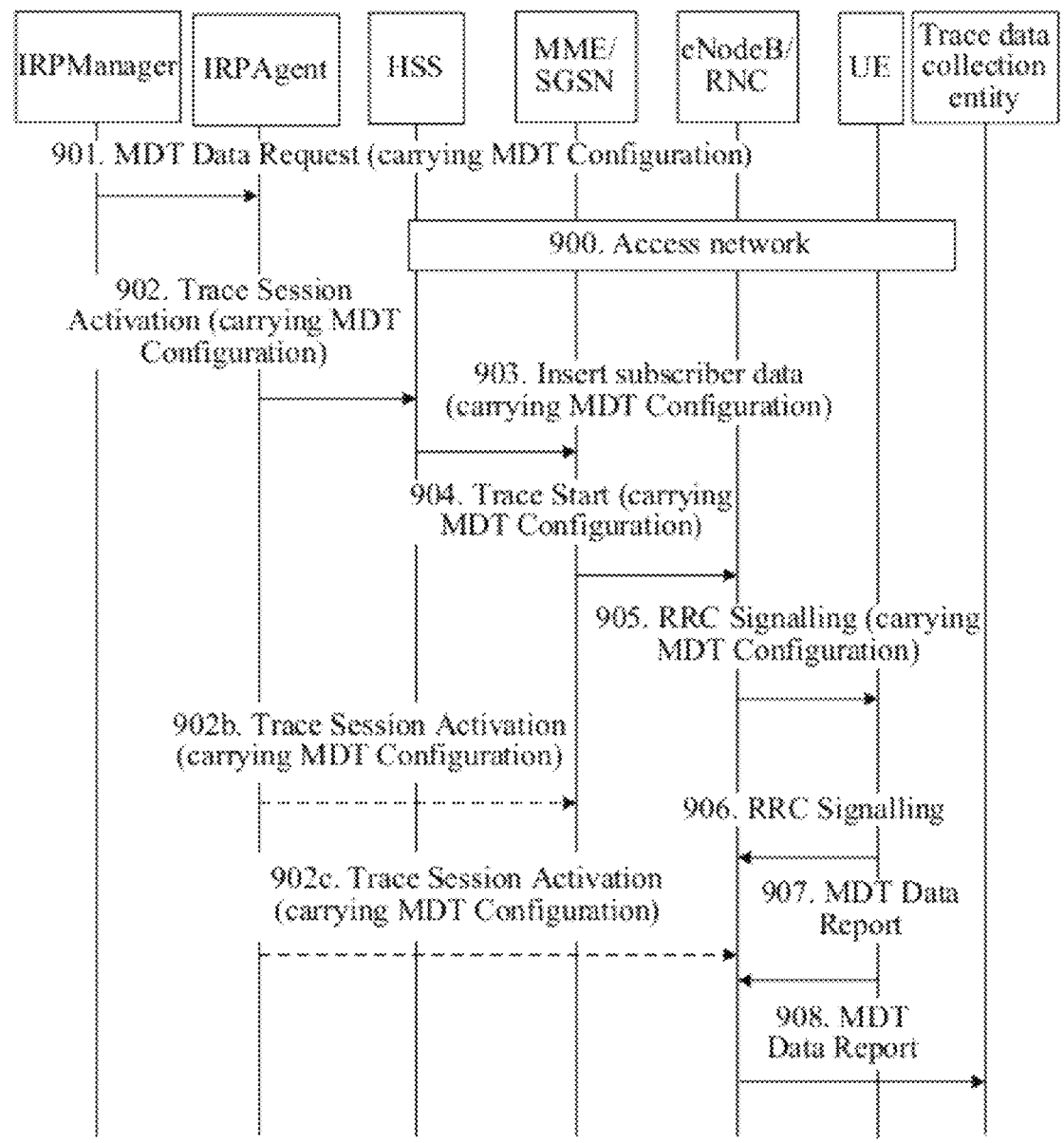
FIG. 9 is a schematic flowchart of a method for collecting terminal measurement data according to another embodiment of the present invention.

FIG. 9 is a schematic flowchart of a method for collecting terminal measurement data according to another embodiment of the present invention, which is a process of collecting measurement data of a single user terminal based on a signaling trace procedure and describes a transfer process of MDT configuration when a UE is located in a network.

900. A UE already accesses a network by using an attach (attach) procedure.

901. An IRP Manager sends a terminal measurement data start operation (MDT Data Request) to an IRP Agent, requesting to collect terminal measurement data, where the message carries configuration parameters used to collect terminal measurement data.

For example, the IRP Manager sends the terminal measurement data start operation (MDT Data Request) to the IRP Agent. The terminal measurement data start operation is used to start terminal measurement data collection and carries the configuration parameters (MDT Configuration) used to collect terminal measurement data.

902. The IRP Agent sends a Trace Session Activation (Trace Session Activation) message to an HSS.

The Trace Session Activation message is used to trigger a signaling trace procedure for a specific user or device and carries the configuration parameters for MDT in addition to public configuration parameters.

In another embodiment of the present invention, the IRP Agent may send the Trace Session Activation (Trace Session Activation) message to an MME/SGSN (902*b*) or an eNodeB/RNC (902*c*), where the Trace Session Activation message carries the configuration parameters (MDT Configuration) used to collect terminal measurement data. For ease of description, in this embodiment, the IRP Agent sends the Trace Session Activation (Trace Session Activation) message to the HSS, which is taken as an example for illustration.

903. The HSS sends the configuration parameters used to collect terminal measurement data to the MME/SGSN by using an insert subscriber data (Insert subscriber data) or Update Location Answer (Update Location Answer) message.

Optionally, the HSS further stores trace configuration parameters and the configuration parameters used to collect terminal measurement data.

904. The MME/SGSN initiates a trace logging session specific to the user, and sends the configuration parameters used to collect terminal measurement data to the eNodeB by using a Trace Start (Trace Start) message.

Optionally, the MME further stores the configuration parameters used to collect terminal measurement data.

905. The eNodeB initiates a trace logging session specific to the user, and sends the configuration parameters used to collect terminal measurement data to the UE by using RRC Signalling, instructing the UE to measure the terminal measurement data.

Optionally, the eNodeB stores the configuration parameters used to collect terminal measurement data.

906. The UE sends a terminal measurement data configuration complete message to the eNodeB. This step is optional.

907-908. The UE sends a terminal measurement data report to the eNodeB, and the eNodeB forwards the report to a trace data collection entity.

In another embodiment of the present invention, the trace data collection entity may be located in the IRP Agent, and the IRP Agent may further send the terminal measurement data report to the IRP Manager.

According to the above technical solution, control commands of terminal measurement data configuration can be delivered, and terminal measurement data can be collected from network elements and user equipments. The collected terminal measurement data may be used to reflect the signal coverage status in an area and used as a reference for adjusting network planning and network optimization parameters.

Figure 10:
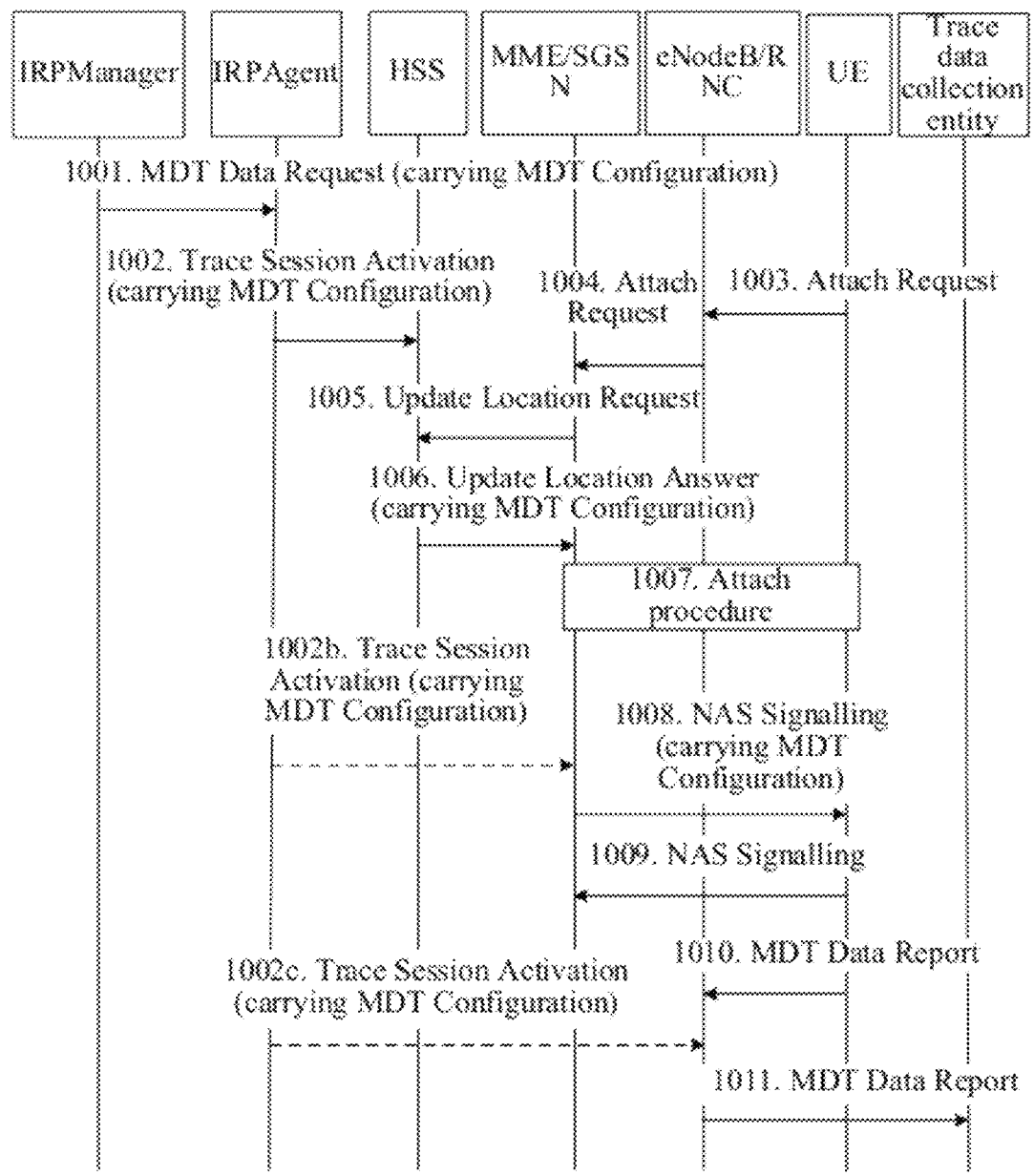
FIG. 10 is a schematic flowchart of a method for collecting terminal measurement data according to another embodiment of the present invention.

FIG. 10 is a schematic flowchart of a method for collecting terminal measurement data according to another embodiment of the present invention, which is a process of collecting measurement data of a single user terminal based on a signaling trace procedure and describes a process where an MME notifies a UE of collecting terminal measurement data.

1001. An IRP Manager sends a terminal measurement data start operation (MDT Data Request) to an IRP Agent.

The terminal measurement data start operation is used to start terminal measurement data collection and carries configuration parameters used to collect terminal measurement data.

1002. The IRP Agent sends a Trace Session Activation (Trace Session Activation) message to an HSS.

The Trace Session Activation message is used to trigger a signaling trace procedure for a specific user or device and carries the configuration parameters (MDT Configuration) used to collect terminal measurement data in addition to public configuration parameters. Optionally, the HSS further stores trace configuration parameters and the configuration parameters used to collect terminal measurement data.

In another embodiment of the present invention, the IRP Agent may send the Trace Session Activation (Trace Session Activation) message to an MME/SGSN (1002*b*) or an eNodeB/RNC (1002*c*), where the Trace Session Activation message carries the configuration parameters (MDT Configuration) used to collect terminal measurement data. For ease of description, in this embodiment, the IRP Agent sends the Trace Session Activation (Trace Session Activation) message to the HSS, which is taken as an example for illustration.

1003-1005. When a user to trace accesses the network, the user sends an Attach Request (Attach Request) to the network and meanwhile updates its location information with the HSS.

1006. The HSS checks whether the user needs tracing, and if yes, sends the configuration parameters used to collect terminal measurement data to the MME/SGSN by using an Update Location Answer (Update Location Answer).

1007. The attach procedure is continued.

1008. The MME/SGSN sends the configuration parameters used to collect terminal measurement data to the UE by using non-access stratum (NAS) signaling.

1009. The UE sends a terminal measurement data configuration complete message to the MME/SGSN by using the NAS signaling. This step is optional.

1010-1011. The UE sends a terminal measurement data report (MDT Data Report) to the eNodeB, and the eNodeB forwards the report to a trace data collection entity.

In another embodiment of the present invention, the trace data collection entity may be located in the IRP Agent, and the IRP Agent may further send the terminal measurement data report to the IRP Manager.

According to the above technical solution, control commands of terminal measurement data configuration can be delivered, and terminal measurement data can be collected from network elements and user equipments. The collected terminal measurement data may be used to reflect the signal coverage status in an area and used as a reference for adjusting network planning and network optimization parameters.

In another embodiment of the present invention, the configuration parameters used to collect terminal measurement data in the embodiments corresponding to FIG. 7, FIG. 8, FIG. 9, and FIG. 10 may include a user identity list, so as to implement the function of collecting measurement data of multiple user terminals.

Figure 11:
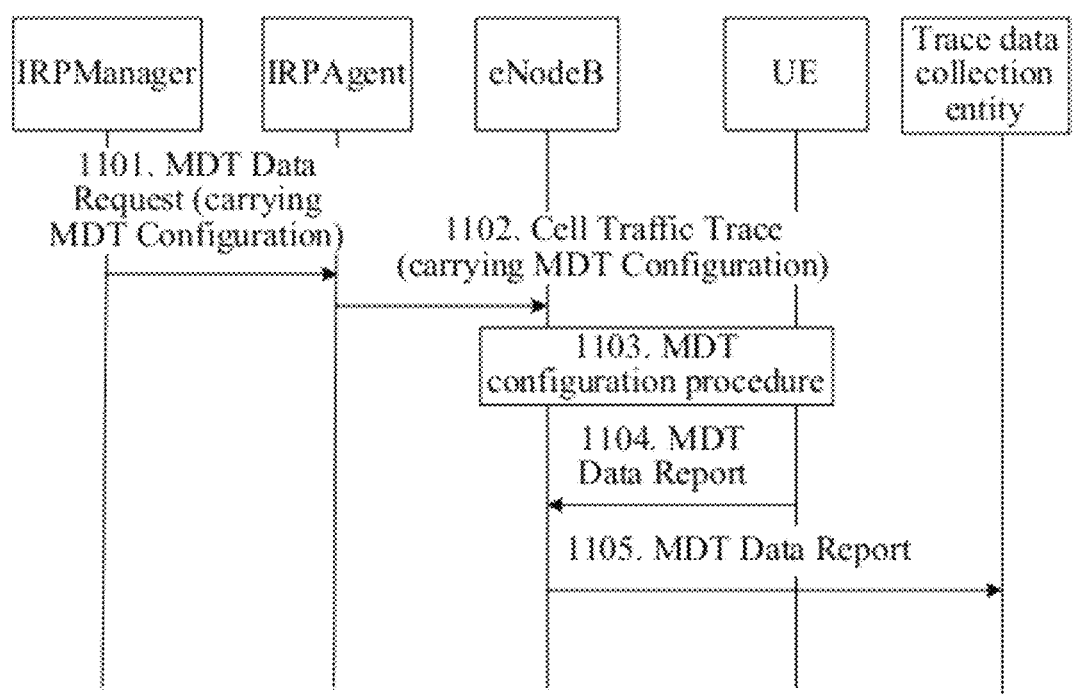
FIG. 11 is a schematic flowchart of a method for collecting terminal measurement data according to another embodiment of the present invention.

FIG. 11 is a schematic flowchart of a method for collecting terminal measurement data according to another embodiment of the present invention, which is a process of collecting measurement data of multiple user terminals based on a management trace procedure and describes a process where an IRP Agent sends configuration parameters used to collect terminal measurement data to a NodeB.

1101. An IRP Manager sends a terminal measurement data start operation (MDT Data Request) to the IRP Agent.

The terminal measurement data start operation is used to start terminal measurement data collection, and the message carries public configuration parameters and configuration parameters for MDT.

1102. The IRP Agent sends a Cell Traffic Trace (Cell Traffic Trace) message to an eNodeB.

The Cell Traffic Trace message is used to trigger signaling trace on a specific cell.

1103. The eNodeB delivers terminal measurement data collection configuration to a UE in a local cell.

1104-1105. The UE sends a terminal measurement data report to the eNodeB, and the eNodeB forwards the report to a trace data collection entity.

In another embodiment of the present invention, the trace data collection entity may be located in the IRP Agent, and the IRP Agent may further send the terminal measurement data report to the IRP Manager.

According to the above technical solution, control commands of terminal measurement data configuration can be delivered, and terminal measurement data can be collected from network elements and user equipments. The collected terminal measurement data may be used to reflect the signal coverage status in an area and used as a reference for adjusting network planning and network optimization parameters.

Figure 12:
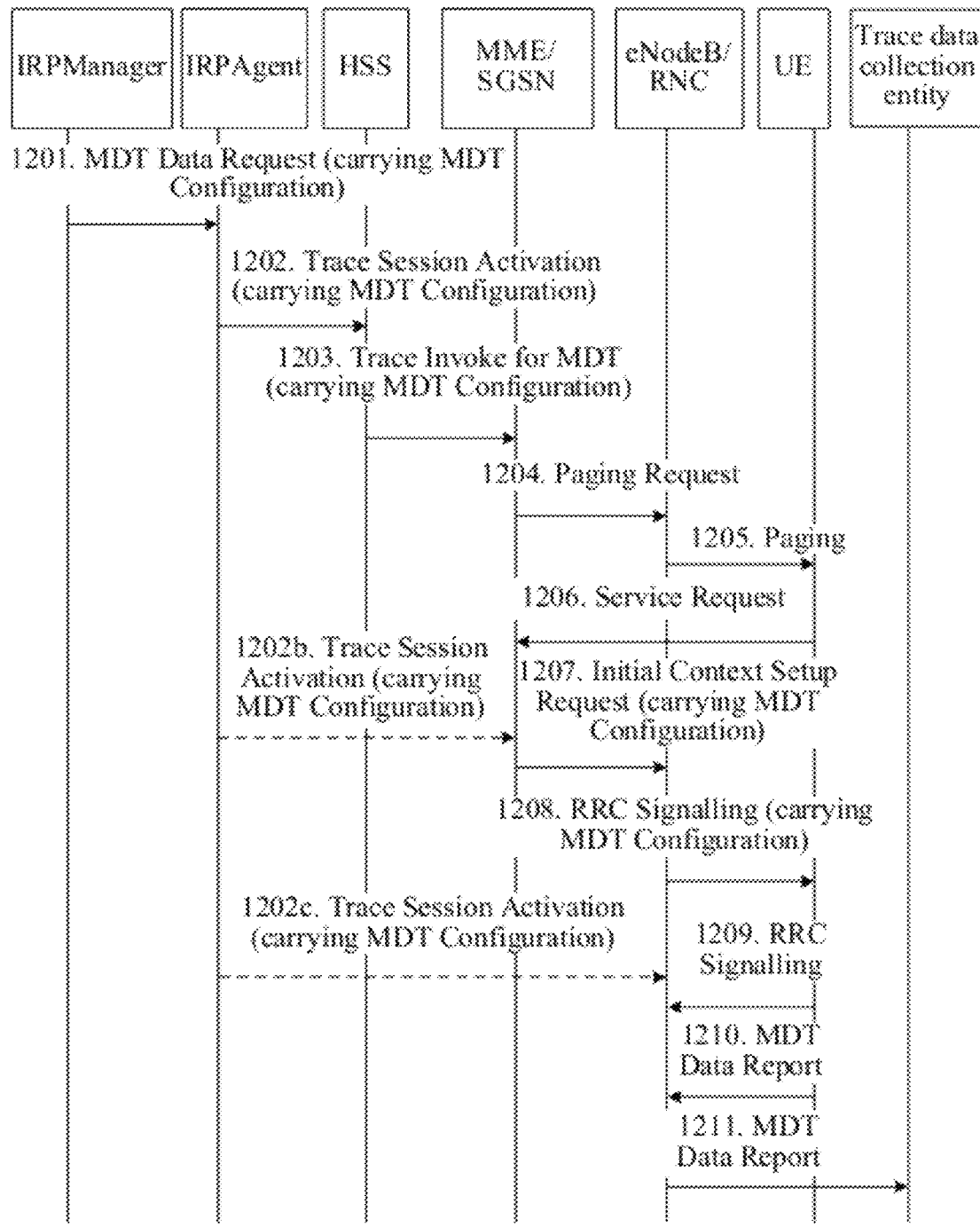
FIG. 12 is a schematic flowchart of a method for collecting terminal measurement data according to another embodiment of the present invention.

FIG. 12 is a schematic flowchart of a method for collecting terminal measurement data in another embodiment of the present invention, which is a process of collecting measurement data of a single user terminal based on a paging procedure and describes a transfer process of MDT configuration when a UE is paged.

1201. An IRP Manager sends a terminal measurement data start operation (MDT Data Request) to an IRP Agent.

The terminal measurement data start operation is used to start terminal measurement data collection and carries configuration parameters used to collect terminal measurement data.

1202. The IRP Agent sends a Trace Session Activation (Trace Session Activation) message to an HSS.

The Trace Session Activation message is used to trigger a signaling trace procedure for a specific user or device and carries the configuration parameters used to collect terminal measurement data. Optionally, the HSS stores trace configuration parameters and the configuration parameters used to collect terminal measurement data.

In another embodiment of the present invention, the IRP Agent may send the Trace Session Activation (Trace Session Activation) message to an MME/SGSN (1202*b*) or an eNodeB/RNC (1202*c*), where the Trace Session Activation message carries the configuration parameters (MDT Configuration) used to collect terminal measurement data. For ease of description, in this embodiment, the IRP Agent sends the Trace Session Activation (Trace Session Activation) message to the HSS, which is taken as an example for illustration.

1203. The HSS sends a Trace Invoke for MDT (Trace Invoke for MDT) message to the MME/SGSN. The Trace Invoke for MDT message carries the configuration parameters used to collect terminal measurement data.

1204. The MME/SGSN sends a Paging Request (Paging Request) to the eNodeB/RNC.

1205. The eNodeB/RNC initiates paging (Paging) of a UE.

1206. In response to the paging, the UE sends a paging response, for example, a Service Request (Service Request), to the MME/SGSN.

1207. The MME/SGSN sends the configuration parameters used to collect terminal measurement data to the eNodeB/RNC by using an Initial Context Setup Request (Initial Context Setup Request).

Optionally, the MME further stores the configuration parameters used to collect terminal measurement data.

1208. The eNodeB sends radio resource control signaling (RRC Signalling) to the UE.

The RRC Signalling carries the configuration parameters used to collect terminal measurement data. The eNodeB sends the configuration parameters used to collect terminal measurement data to the UE, instructing the UE to measure the terminal measurement data.

Optionally, the eNodeB further stores the configuration parameters used to collect terminal measurement data.

1209. The UE sends a terminal measurement data configuration complete message to the eNodeB by using the RRC Signalling. This step is optional.

1210-1211. The UE sends a terminal measurement data report (MDT Data Report) to the eNodeB, and the eNodeB forwards the report to a trace data collection entity.

In another embodiment of the present invention, the trace data collection entity may be located in the IRP Agent, and the IRP Agent may further send the terminal measurement data report to the IRP Manager.

In another embodiment of the present invention, when the UE is detached or idle, a transfer process of its terminal measurement data configuration may be as follows.

Figure 13:
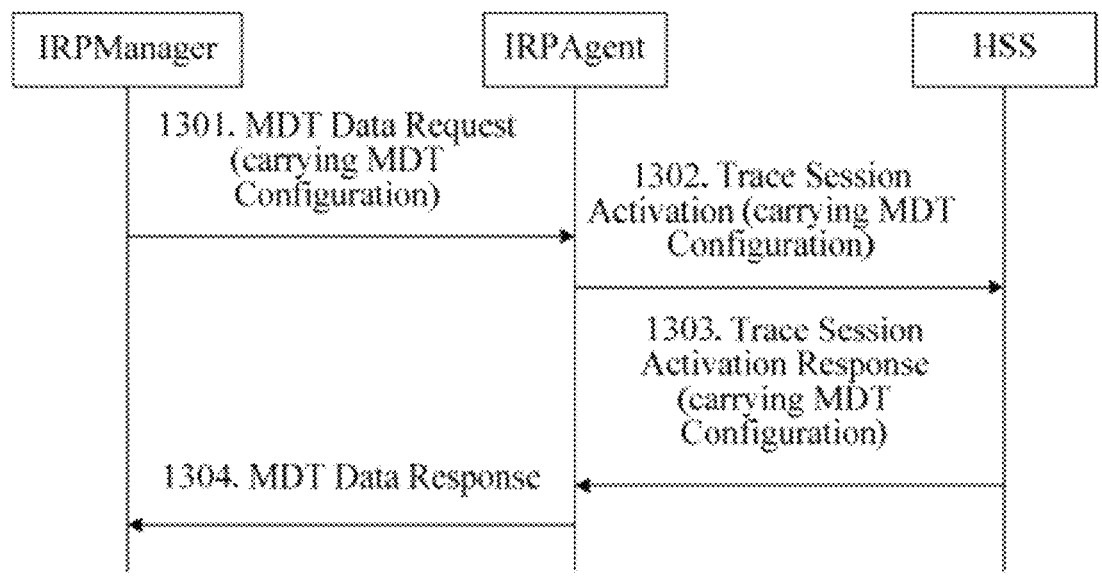
FIG. 13 is a schematic diagram of a transfer process of terminal measurement data configuration according to another embodiment of the present invention.

FIG. 13 is a schematic diagram of a transfer process of terminal measurement data configuration in another embodiment of the present invention, describing the transfer process of terminal measurement data configuration when a UE is detached or idle.

1301. An IRP Manager sends a terminal measurement data start operation (MDT Data Request) to an IRP Agent.

The terminal measurement data start operation is used to start terminal measurement data collection and carries configuration parameters used to collect terminal measurement data.

1302. The IRP Agent sends a Trace Session Activation (Trace Session Activation) message to an HSS.

The Trace Session Activation message is used to trigger a signaling trace procedure for a specific user or device and carries the configuration parameters used to collect terminal measurement data. Optionally, the HSS stores trace configuration parameters and the configuration parameters used to collect terminal measurement data.

In another embodiment of the present invention, the IRP Agent may send the Trace Session Activation message to an MME, or SGSN, or eNodeB, or RNC, where the Trace Session Activation message carries the configuration parameters used to collect terminal measurement data. For ease of description, the HSS is used as an example for illustration of this embodiment.

1303. The HSS sends a Trace Session Activation Response (Trace Session Activation Response) to the IRP Agent.

Because the UE is detached or idle, the HSS sends the Trace Session Activation Response to the IRP Agent, notifying the IRP Agent of the state information of the UE.

1304. The IRP Agent sends a terminal measurement data response to the IRP Manager.

Figure 14:
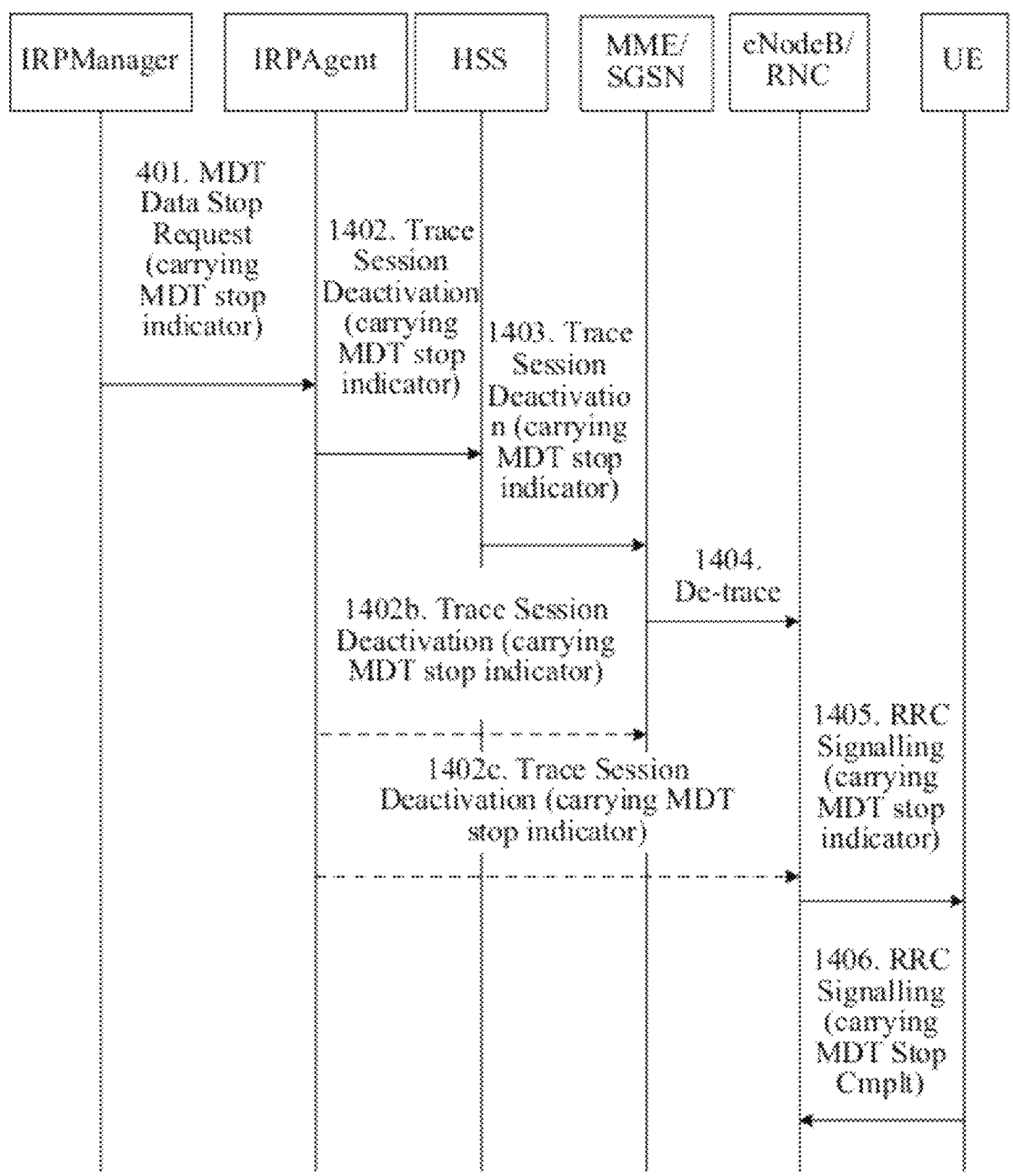
FIG. 14 is a schematic diagram of a process of terminating terminal measurement data collection according to another embodiment of the present invention.

In another embodiment of the present invention, when it is necessary to terminate the measurement of terminal measurement data of the UE, the process may be that shown in FIG. 14, which is a schematic diagram of a process of terminating terminal measurement data collection. The details are in the following.

1401. An IRP Manager sends a terminal measurement data stop request (MDT Data Stop) to an IRP Agent.

The terminal measurement data stop request carries a terminal measurement stop indicator (MDT stop indicator).

1402. The IRP Agent sends a Trace Session Deactivation (Trace Session Deactivation) message to an HSS.

The Trace Session Deactivation message carries the terminal measurement stop indicator.

In another embodiment of the present invention, the IRP Agent may send the Trace Session Deactivation message to an MME/SGSN (1402*b*) or an eNodeB/RNC (1402*c*), where the Trace Session Deactivation message carries the terminal measurement stop indicator (MDT stop indicator). For ease of description, in this embodiment, the IRP Agent sends the Trace Session Deactivation message to the HSS, which is taken as an example for illustration.

Optionally, the eNodeB further stores the terminal measurement stop indicator (MDT stop indicator).

1406. The UE sends a drive test stop configuration complete message (MDT Stop Cmplt) to the eNodeB by using RRC Signalling.

In another embodiment of the present invention, corresponding to the embodiments illustrated in FIGS. 7 to 12, the terminal measurement data start operation may be an Active Trace Job (Active Trace Job) message of a trace northbound interface; or a Create Measurement Job (CreateMeasurementJob) message of a performance management northbound interface; or a message of a terminal measurement data collection northbound interface. The IRP Manager may send a terminal measurement data collection request to the IRP Agent in the following three methods.

Method 1: Reuse a command of the trace northbound interface.

Table 1 lists the specific configuration parameters used to collect terminal measurement data and their meanings.

TABLE 1

| Parameter | Description |
| --- | --- |
| IOCInstance | For MDT of a single user, identifies the MME and HSS entities that store the user account information. |
| | For MDT in an area, specifies the object instances for which MDT is to be activated. |
| List of network element types (listOfNeTypes) | For MDT of a single user, specifies the network element type, such as MME or HSS. |
| | For MDT in an area, indicates the NodeB (eNodeB). |
| Trace target information (traceTarget) | For MDT of a single user, specifies the identification information of the user, such as IMSI or IMEI (SV). |
| | For MDT of users in an area, specifies the area where MDT need be performed, including one cell, one group of cells, one or more TAs, and one or more NodeBs. |
| Terminal measurement data indicator (MDTIndicator) | This identifier is different from the original trace function, and indicates whether it is necessary to collect the terminal measurement data of a UE. |
| UE measurement data collection criteria (UEdataCollectionCriteria) | Criteria for collecting UE measurement data, for example, including the period of UE measurement data collection, the period of UE measurement data reporting, the collecting time segment, the trigger condition of collection stop (for example, the UE moves outside the area of collection), the coverage of the selected UE, and the requirements on mobile phone performance indexes (such as the required electrical power of the UE and the required storage space of the UE). |
| Selected UE measurements information to be reported (SelectedUEmeasurementsInfo) | Includes the selected UE measurements information to be reported. |
| Terminal measurement data report address (traceCollectionEntityAddress) | Indicates the address to which the terminal measurement data is reported. |

1403. The HSS sends the Trace Session Deactivation message to the MME/SGSN.

The Trace Session Deactivation message carries the terminal measurement stop indicator.

1404. The MME/SGSN initiates trace stop to the eNodeB/RNC.

1405. The eNodeB sends radio resource control signaling (RRC Signalling) to the UE.

The RRC Signalling carries the terminal measurement stop indicator. The eNodeB sends the terminal measurement stop indicator to the UE, instructing the UE to terminate measurement of the terminal measurement data.

The terminal measurement data indicator (MDTIndicator) may have the following two implementations.

Implementation 1: Modify a list of interfaces (listofInterfaces) of an existing trace interface to add an identifier instructing to collect UE measurement data.

Implementation 2: Add a new identifier that instructs to collect UE measurement data.

Method 2: Reuse a performance management northbound interface command of the northbound interface.

Table 2 lists the specific configuration parameters used to collect terminal measurement data and their meanings.

TABLE 2

| Parameter Name | Comment |
| --- | --- |
| UE measurement type object class (iOCName) | UE measurement type object class |
| List of scope of terminal measurement data collection (iOCInstanceList) | Indicates the scope of terminal measurement data collection, for example, instances of eNodeBs or cells. |
| UE measurement data collection criteria (UEdataCollectionCriteria) | Criteria for collecting UE measurement data (including the trigger condition of collection stop, the coverage of the selected UE, and the requirements on mobile phone performance indexes). |
| Selected UE measurements information to be reported (SelectedUEmeasurementsInfo) | Includes the selected UE measurements information to be reported. |
| MDT start time (startTime) | Indicates the start time of MDT. |
| MDT stop time (stopTime) | Indicates the end time of MDT. |
| MDT scheduling period (schedule) | Indicates the scheduling period of MDT. |
| MDT priority (priority) | Indicates the priority of MDT. |
| MDT target identifier (targetUser) | Valid only for MDT of a single user, specifying the IMSI or IMEI of the user. |

Method 3: Define a new terminal measurement data collection interface on the northbound interface for collection of terminal measurement data.

Table 3 lists the specific configuration parameters used to collect terminal measurement data and their meanings.

TABLE 3

| Parameter Name | Comment |
| --- | --- |
| UE measurement object class (iOCName) | UE measurement object class |
| MDT type indicator (mdtTypeIndicator) | MDT type indicator, including MDT of a single user and MDT in an area. |
| MDT target identifier (target) | For MDT of a single user, specifies the IMSI or IMEI (SV) of the user. For MDT of multiple users, specifies the area where MDT need be performed, including one cell, one group of cells, one or more TAs, and one or more NodeBs. |
| List of scope of terminal measurement data collection (iOCInstanceList) | Scope of terminal measurement data collection, such as MME/HSS instances and eNodeB instances. |
| UE measurement data collection criteria (UEdataCollectionCriteria) | Criteria for collecting UE measurement data (including the period of UE measurement data collection, the period of UE measurement data reporting, the collection time segment, and the trigger condition of collection stop). |
| Selected UE measurements information to be reported (SelectedUEmeasurementsInfo) | Includes the selected UE measurements information to be reported. |
| Coverage of the selected UE (SelectedUeProbability) | Coverage of the selected UE |
| Device performance indexes (DeviceTypeInformation) | For example, the requirements on mobile phone performance indexes such as UE electrical power information, UE storage information and UE type information. |

In another embodiment of the present invention, UE measurements information (SelectedUEmeasurementsInfo) includes any combination of the following parameters: UE location (Location), time information, measurement item of serving cell, and measurement item of one or more neighbor cells.

In another embodiment of the present invention, the measurement item of serving cell may include any combination of the following options: global cell identity (CGI, Global Cell Identity) or physical cell identity (PCI, Physical Cell Identity), reference signal received power (RSRP, Reference Signal Received Power), reference signal received quality (RSRQ, Reference Signal Received Quality), power headroom report (PHR, Power Headroom Report), timing advance (TA, Timing Advance), signal to interference-plus-noise ratio SINR, signal-to-noise ratio SNR and signal-to-interference ratio SIR.

In another embodiment of the present invention, the measurement item of one or more neighbor cells may include any combination of the following options: global cell identity (CGI) or physical cell identity (PCI), reference signal received power (RSRP), reference signal received quality (RSRQ), and frequency point information.

In another embodiment of the present invention, the UE measurement data collection criteria may include: data collection mode, data reporting mode and Logging triggering events.

In another embodiment of the present invention, the data collection mode may be one of the following modes: periodical type, including collection period; event triggered type, including triggering events; periodical event type, including collection period and triggering events; collection time segment; and collection stop condition.

For example, the collection stop condition may be automatically stopping data collection when the UE leaves the area of measurement, or automatically stopping data collection when the UE leaves the current cell.

In another embodiment of the present invention, the data reporting mode may be one of the following modes: report probability type; periodical reporting type, including report period; and event triggered type, including triggering events.

For example, in the event triggered type, the triggering event includes one of the following options: electrical power below threshold, storage space below threshold, local cell RSRP below threshold, and neighbor cell RSRP above threshold.

In another embodiment of the present invention, logging (Logging) triggering events include: automatically starting logging (logging) when an active UE fails to meet the data collection requirement, periodical logging (logging) of downlink pilot signal strength, serving cell signal strength below threshold, random access failed, paging channel decoding failed, broadcast channel decoding failed, and radio link failed.

For the new terminal measurement data collection northbound interface, when data is reported, a file format of the terminal measurement data report may be defined as shown in Table 4.

TABLE 4

| name | Need | Length (Byte) | Description |
| --- | --- | --- | --- |
| Intra-freq measurement Type | MP | 1 | Intra-frequency measurement type |
| Event type | MP | 1 | Event type |
| Max_measurement_num | MP | 1 | Maximum number of measurements |
| Intra-frequency cell measurement results list | MP | | List of intra-frequency cell measurement results |
| PCI | MP | Integer (0, ..., 503) | Physical cell identity |
| Cell ID (GCI) | OP | 4 | Cell identity |
| RSRP | MP | 1 | |
| RSRQ | MP | 1 | |
| Relative time stamp >Second (s) | MP | Integer (0, ..., 2048000) | Relative time stamp Second |

MP indicates mandatory and OP indicates optional.

In another embodiment of the present invention, the data reported by UE measurements may include any combination of the following information: 1. interface type; 2. message type; 3. unique call identity; 4. measured cell ID corresponding to the UE measurements or measured cell ID location information corresponding to the UE measurements; 5. time information; 6. location information; and 7. specific measurement values.

In another embodiment of the present invention, for the management of UE measurement data, required management commands include a data collection stop command and a data collection job query command.

The data collection stop command may directly reuse an existing trace deactivation (deactivation) command and an existing PM job delete command.

The data collection job query command may list, in output parameters, how many UEs that are currently participating in the UE data collection job, for example, reusing an existing trace interface command. A list of the output parameters is given in Table 5.

TABLE 5

| Parameter Name | Comment |
| --- | --- |
| traceReferenceList | Trace reference list, providing an identifier of each active trace session. If no trace reference identifier is detected, the list is null and the status identifier indicates success. |
| NumberOfUEParticipatingCollection | The number of UEs participating in the collection of UE measurement data. |
| status | Status information; The operation may fail because of one specific or unknown reason. |

In another embodiment of the present invention, when a UE undergoes a handover procedure, a source NodeB or MME/SGSN/MSC may send configuration parameters used to collect terminal measurement data or a terminal measurement stop indicator to a destination NodeB.

Figure 15:
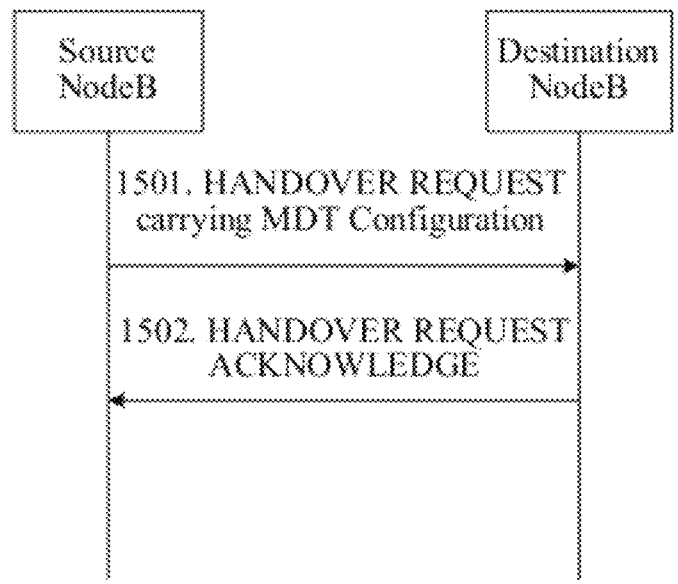
FIG. 15 is a schematic diagram of a transfer process of terminal measurement data during a handover procedure according to another embodiment of the present invention.

For example, FIG. 15 is a schematic diagram of a transfer process of terminal measurement data during a handover procedure according to another embodiment of the present invention, which describes a transfer process of terminal measurement data during an X2 interface handover procedure.

1501. A source NodeB sends a HANDOVER REQUEST (HANDOVER REQUEST) to a destination NodeB.

The HANDOVER REQUEST carries configuration parameters used to collect terminal measurement data or a terminal measurement stop indicator.

1502. The destination NodeB feeds back a HANDOVER REQUEST ACKNOWLEDGE (HANDOVER REQUEST ACKNOWLEDGE) to the source NodeB.

The description of the foregoing embodiments may be referred to for the subsequent MDT collection or stop procedure, which will not be repeated here.

Figure 16:
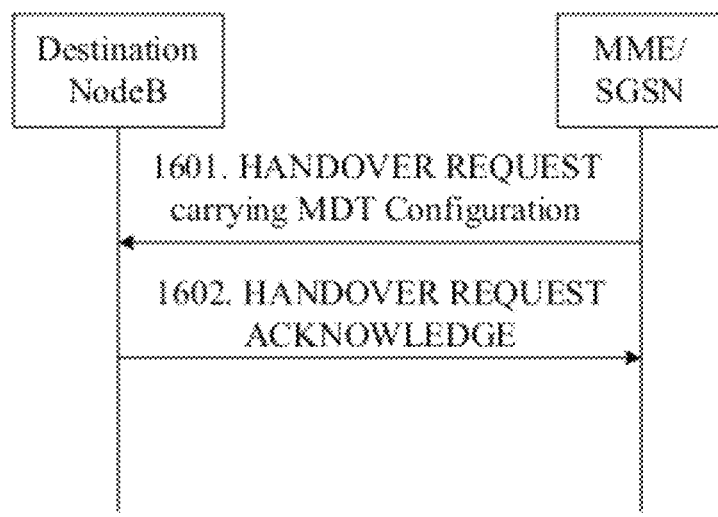
FIG. 16 is a schematic diagram of a transfer process of terminal measurement data during a handover procedure according to another embodiment of the present invention.

In another embodiment of the present invention, when a UE undergoes a handover procedure, configuration parameters used to collect terminal measurement data or a terminal measurement stop indicator may be sent to a destination NodeB. For example, FIG. 16 is a schematic diagram of a transfer process of terminal measurement data during a handover procedure according to another embodiment of the present invention, which describes a transfer process of terminal measurement data during an 51 interface handover procedure.

1601. An MME/SGSN sends a HANDOVER REQUEST (HANDOVER REQUEST) to a destination NodeB.

The HANDOVER REQUEST carries configuration parameters used to collect terminal measurement data or a terminal measurement stop indicator.

1602. The destination NodeB feeds back a HANDOVER REQUEST ACKNOWLEDGE (HANDOVER REQUEST ACKNOWLEDGE) to the MME/SGSN.

The description of the foregoing embodiments may be referred to for the subsequent MDT collection or stop procedure, which will not be repeated here.

The foregoing technical solution implements delivery of control commands of terminal measurement data configuration and allows terminal measurement data collection from network elements of vendors. The collected terminal measurement data may be used for the following purposes:

1. Learn about the signal coverage status in an area, and use the terminal measurement data as a reference for adjusting network planning and network optimization parameters.

2. A specific user is selected for terminal measurement data collection when the user complains about the network signal.

In addition to the LTE, the method of the present invention is also applicable to MDT northbound function of GSM, WCDMA, CDMA, and Wimax. The access network solution of the present invention is also applicable to GSM, WCDMA, CDMA, and Wimax and the solutions for different communication fields are alike.

In an LTE system, the NodeB is an eNodeB (Evolved NodeB, evolved NodeB, abbreviated to eNodeB). For the purpose of simplifying signaling procedures and shortening the delay, the E-UTRAN discards the RNC (Radio Network Controller, radio network controller)-NodeB structure of the universal terrestrial radio access network (UTRAN, Universal Terrestrial Radio Access Network) and includes only eNodeBs (NodeBs).

Figure 17:
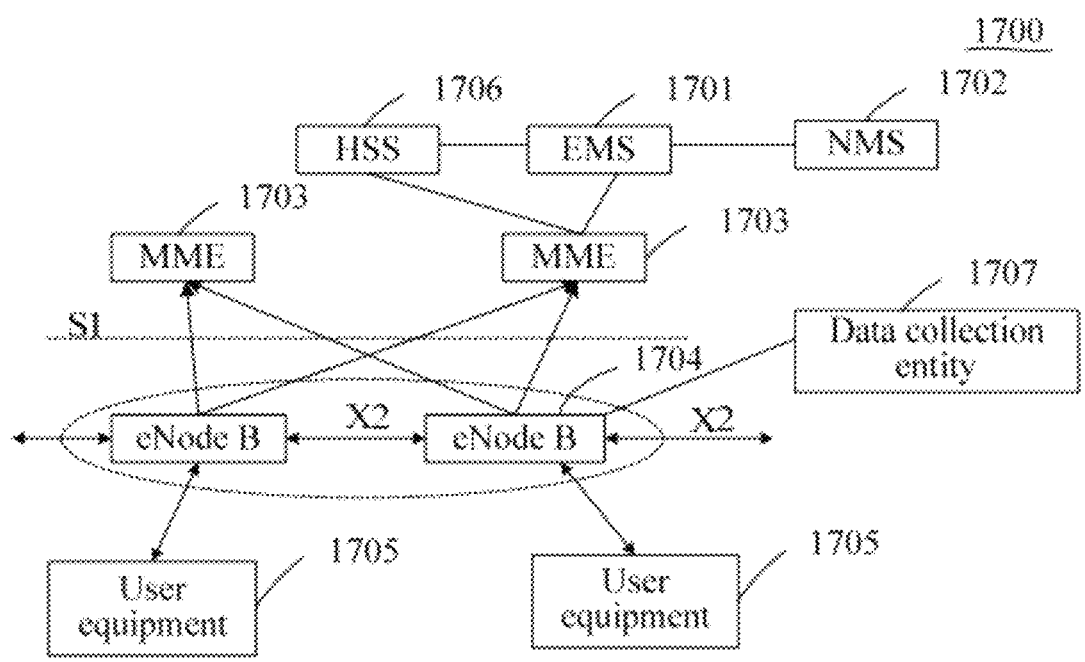
FIG. 17 is a brief schematic diagram of an LTE network architecture according to another embodiment of the present invention.

FIG. 17 is a brief schematic diagram of an LTE network architecture according to another embodiment of the present invention. The LTE communication system 1700 includes an IRP Agent 1701, an IRP Manager 1702, an MME 1703, an eNodeB 1704, and an HSS 1706.

In another embodiment of the present invention, the eNodeB 1704 and the MME 1703 can communicate with each other by using optical, electrical or radio approaches. Multiple signals may be transmitted between the eNodeBs 1704 by using optical paths and transmitted to the MME 1703 via the eNodeB 1704.

User equipments 1705 access the network through the eNodeB 1704, for example, through one eNodeB or different eNodeBs.

The MME 1703 communicates with the IRP Manager 1702 through the IRP Agent 1701. The MME 1703 is also communicatively connected with the HSS 1706.

The LTE communication system 1700 shown in FIG. 17 displays only two eNodeBs 1704 and two MMEs 1703. However, the LTE communication system 1700 may include any number of eNodeBs 1704 or MMEs 1703. Moreover, when multiple eNodeBs 1704 and multiple MMEs 1703 form a one-to-one mapping relation, the multiple eNodeBs 1704 may be connected with the MMEs 1703, and vice versa.

In another embodiment of the present invention, the user equipment 1705 and the eNodeB 1704 communicate with each other through an $u_n$ interface; the eNodeB 1704 and the MME 1703 communicate with each other through an S1 interface, for example, connected by using an optical fiber or other transmission means. IP transport is adopted for bottom layer transmission between the eNodeBs 1704 which are logically connected with each other through an X2 interface or other interfaces (such as an S1 interface). These devices may also communicate with each other through other interfaces or self-defined interfaces, which is not limited by the present invention.

The IRP Manager 1702 is configured to send a terminal measurement data start operation or terminal measurement data stop operation to the IRP Agent 1701, where the terminal measurement data start operation is used to start terminal measurement data collection and carries configuration parameters used to collect terminal measurement data, and the terminal measurement data stop operation is used to instruct stop of terminal measurement data collection.

The IRP Agent 1701 is configured to notify, over the network, a UE of initiating terminal measurement data collection or terminating terminal measurement data collection.

For example, optionally, the terminal measurement data stop operation carries a terminal measurement stop indicator, and the IRP Agent 1701 is configured to send the configuration parameters used to collect terminal measurement data or the terminal measurement stop indicator to the UE over the network, so that the UE initiates terminal measurement data collection according to the configuration parameters used to collect terminal measurement data or terminates terminal measurement data collection according to the terminal measurement stop indicator.

For example, the IRP Agent 1701 is configured to send a Trace Session Activation (Trace Session Activation) message or Trace Session Deactivation message to the HSS 1706, or MME 1703, or eNodeB 1704.

In another embodiment of the present invention, the IRP Agent 1701 may be configured to send the Trace Session Activation or Trace Session Deactivation message to the SGSN or RNC.

The Trace Session Activation message is used to trigger a signaling trace procedure for a specific user or device and carries the configuration parameters (MDT Configuration) used to collect terminal measurement data. The Trace Session Deactivation message carries the terminal measurement stop indicator used to instruct termination of terminal measurement data collection.

Optionally, the HSS 1706 is further configured to store trace configuration parameters and the configuration parameters used to collect terminal measurement data.

When the user equipment 1705 to trace accesses the network, the user equipment 1705 sends an Attach Request (Attach Request) to the network and meanwhile updates its location information with the HSS 1706.

The HSS 1706 checks whether the user needs tracing, and if yes, sends the configuration parameters used to collect terminal measurement data to the MME 1703 or SGSN by using an Update Location Answer (Update Location Answer) or Trace Invoke for MDT (Trace Invoke for MDT) message.

The MME 1703 or SGSN initiates a trace logging session specific to the user, and sends the configuration parameters used to collect terminal measurement data to the eNodeB 1704 by using an Initial Context Setup Request (Initial Context Setup Request) or a CN Invoke Trace (CN Invoke Trace) message. Optionally, the MME 1703 stores the configuration parameters used to collect terminal measurement data.

In another embodiment of the present invention, the HSS 1706 sends the configuration parameters used to collect terminal measurement data to the MME 1703 or SGSN by using insert subscriber data (Insert subscriber data); and the entity receiving the configuration parameters used to collect terminal measurement data sends the configuration parameters used to collect terminal measurement data to the eNodeB 1704 by using a Trace Start (Trace Start) message.

In another embodiment of the present invention, the HSS 1706 sends the configuration parameters used to collect terminal measurement data to the MME 1703 or SGSN by using a Trace Invoke for MDT (Trace Invoke for MDT) message; and the entity receiving the configuration parameters used to collect terminal measurement data initiates paging, and sends the configuration parameters used to collect terminal measurement data to the eNodeB 1704 by using an Initial Context Setup (Initial Context Setup) Request after receiving a paging response returned by the user equipment.

The eNodeB 1704 sends the configuration parameters used to collect terminal measurement data or the terminal measurement stop indicator to the user equipment 1705 by using Radio Resource Control Signaling (RRC Signalling). Optionally, the eNodeB 1704 stores the configuration parameters used to collect terminal measurement data or the terminal measurement stop indicator.

The eNodeB 1704 sends the configuration parameters used to collect terminal measurement data to the user equipment 1705, instructing the user equipment 1705 to measure the terminal measurement data.

Optionally, the user equipment 1705 sends a terminal measurement data configuration complete message to the eNodeB 1704.

The user equipment 1705 sends a terminal measurement data report (MDT Data Report) to the eNodeB 1704, and the eNodeB 1704 forwards the report to a data collection entity 1707.

In another embodiment of the present invention, the data collection entity 1707 may be located in the IRP Agent 1701, and the IRP Agent 1701 may further send the terminal measurement data report to the IRP Manager 1702.

In another embodiment of the present invention, when the UE is located in the network, the transfer process of MDT configuration may be as follows.

The IRP Manager 1702 sends a terminal measurement data start operation to the IRP Agent 1701 to request collecting terminal measurement data, where the message carries configuration parameters used to collect terminal measurement data.

The IRP Agent 1701 sends a Trace Session Activation (Trace Session Activation) message to the HSS 1706. The Trace Session Activation message is used to trigger a signaling trace procedure for a specific user or device and carries the configuration parameters for MDT in addition to public configuration parameters.

The HSS 1706 sends the configuration parameters used to collect terminal measurement data to the MME 1703 by using an insert subscriber data (Insert subscriber data) or Update Location Answer (Update Location Answer) message. Optionally, the HSS 1706 stores trace configuration parameters and the configuration parameters used to collect terminal measurement data.

The MME 1703 initiates a trace logging session specific to the user, and sends the configuration parameters used to collect terminal measurement data to the eNodeB 1704 by using a Trace Start message. Optionally, the MME 1703 further stores the configuration parameters used to collect terminal measurement data.

The eNodeB 1704 initiates a trace logging session specific to the user, and sends the configuration parameters used to collect terminal measurement data to the user equipment 1705 by using RRC Signalling, instructing the user equipment 1705 to measure the terminal measurement data. Optionally, the eNodeB 1704 further stores the configuration parameters used to collect terminal measurement data.

Optionally, the user equipment 1705 sends a terminal measurement data configuration complete message to the eNodeB 1704.

The user equipment 1705 sends a terminal measurement data report to the eNodeB 1704, and the eNodeB 1704 forwards the report to the data collection entity 1707.

In another embodiment of the present invention, the MME 1703 sends a terminal measurement data configuration request to the user equipment 1705 by using NAS signaling, notifying the user equipment 1705 of measuring the terminal measurement data.

In another embodiment of the present invention, the IRP Agent 1701 sends the terminal measurement data configu-
ration to the user equipment 1705 by using a Cell Traffic Trace (Cell Traffic Trace) message, notifying the user equipment 1705 of measuring the terminal measurement data.

In another embodiment of the present invention, when the user equipment 1705 undergoes a handover procedure, the configuration parameters used to collect terminal measurement data or the terminal measurement stop indicator is also sent to a destination NodeB during the handover procedure.

For example, in the transfer process of an X2 interface handover procedure, a source NodeB sends a HANDOVER REQUEST (HANDOVER REQUEST) to the destination NodeB, where the HANDOVER REQUEST carries the configuration parameters used to collect terminal measurement data or the terminal measurement stop indicator.

For example, in the transfer process of an 51 interface handover procedure, the MME sends a HANDOVER REQUEST (HANDOVER REQUEST) to the destination NodeB, where the HANDOVER REQUEST carries the configuration parameters used to collect terminal measurement data or the terminal measurement stop indicator.

Figure 18:
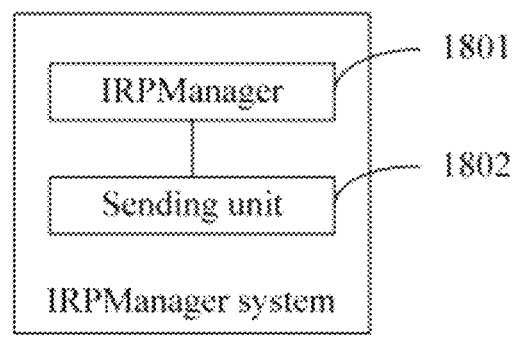
FIG. 18 is a schematic structural diagram of an NMS according to another embodiment of the present invention.

FIG. 18 is a schematic structural diagram of an IRP Manager system according to another embodiment of the present invention. The IRP Manager system includes an IRP Manager 1801 and a sending unit 1802.

The IRP Manager 1801 is configured to configure configuration parameters used to collect terminal measurement data or a terminal measurement stop indicator.

The specific configuration parameters used to collect terminal measurement data and their meanings are described in Table 1, 2, or 3 and will not be repeated here.

The sending unit 1802 is configured to send a terminal measurement data start operation or terminal measurement data stop operation to an IRP Agent. The terminal measurement data start operation is used to start terminal measurement data collection and carries the configuration parameters used to collect terminal measurement data, and the terminal measurement data stop operation is used to instruct stop of terminal measurement data collection and carries the terminal measurement stop indicator. The IRP Agent sends the configuration parameters used to collect terminal measurement data or the terminal measurement stop indicator to a UE.

Figure 19:
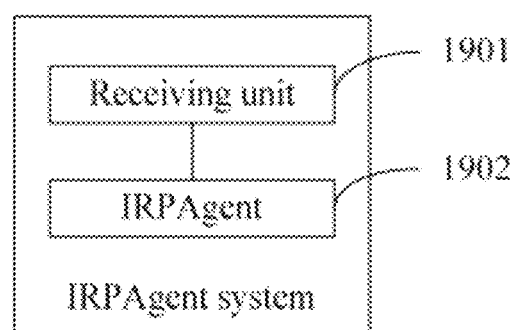
FIG. 19 is a schematic structural diagram of an EMS according to another embodiment of the present invention.

FIG. 19 is a schematic structural diagram of an IRP Agent system according to another embodiment of the present invention. The IRP Agent system includes a receiving unit 1901 and an IRP Agent 1902.

The receiving unit 1901 is configured to receive a terminal measurement data start operation or terminal measurement data stop operation sent by an IRP Manager, where the terminal measurement data start operation is used to start terminal measurement data collection and carries configuration parameters used to collect terminal measurement data, and the terminal measurement data stop operation is used to instruct stop of terminal measurement data collection.

The IRP Agent 1902 is configured to notify, over a network, a UE of initiating terminal measurement data collection or terminating terminal measurement data collection.

For example, optionally, the terminal measurement data stop operation carries a terminal measurement stop indicator, and the IRP Agent 1902 is configured to send the configuration parameters used to collect terminal measurement data or the terminal measurement stop indicator to the UE over the network, so that the UE initiates terminal measurement data collection according to the configuration parameters used to collect terminal measurement data or terminates terminal measurement data collection according to the terminal measurement stop indicator.

For example, the IRP Agent 1902 is specifically configured to send a Trace Session Activation or Trace Session Deactivation message to an HSS, MME, SGSN, eNodeB, or RNC, or MSC. The Trace Session Activation message is used to trigger a signaling trace procedure for a specific user or device and carries the configuration parameters used to collect terminal measurement data, and the Trace Session Deactivation message carries the terminal measurement stop indicator. The entity receiving the Trace Session Activation or Trace Session Deactivation message sends the configuration parameters used to collect terminal measurement data or the terminal measurement stop indicator to the UE.

In another embodiment of the present invention, the IRP Agent 1902 sends the terminal measurement data configuration to the UE by using a Cell Traffic Trace message, notifying the UE of measuring the terminal measurement data.

Figure 20:
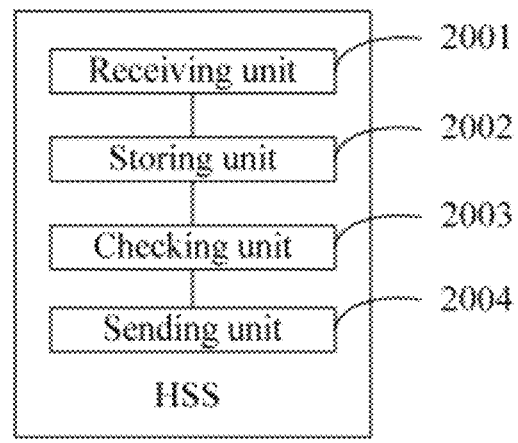
FIG. 20 is a schematic structural diagram of an HSS according to another embodiment of the present invention.

FIG. 20 is a schematic structural diagram of an HSS in another embodiment of the present invention. The HSS includes a receiving unit 2001, a storing unit 2002, a checking unit 2003, and a sending unit 2004.

The receiving unit 2001 is configured to receive a Trace Session Activation or Trace Session Deactivation message sent by an IRP Agent. The Trace Session Activation message is used to trigger a signaling trace procedure for a specific user or device and carries configuration parameters used to collect terminal measurement data, and the Trace Session Deactivation message carries a terminal measurement stop indicator used to instruct termination of terminal measurement data collection.

The sending unit 2004 is configured to send the configuration parameters used to collect terminal measurement data or the terminal measurement stop indicator to a UE through an MME or an SGSN.

The storing unit 2002 is configured to store trace configuration parameters and the configuration parameters used to collect terminal measurement data. The storing unit 2002 is optional, and the sending unit 2004 may send the configuration parameters used to collect terminal measurement data or the terminal measurement stop indicator to the MME or the SGSN directly.

The checking unit 2003 is optional. For example, two occasions are distinguished for a transfer process of the configuration parameters used to collect terminal measurement data.

For example, when a user to trace accesses a network, the user sends an Attach Request (Attach Request) to the network and meanwhile updates its location information with the HSS. Then, the checking unit 2003 is configured to check whether the user needs tracing, and if yes, the sending unit 2004 is configured to send the configuration parameters used to collect terminal measurement data to the MME by using an Update Location Answer (Update Location Answer), and the MME further sends the parameters to the UE.

For example, when the UE is already located in the network, the checking unit 2003 is not needed. The sending unit 2004 is configured to send the configuration parameters used to collect terminal measurement data to the MME by using an insert subscriber data (Insert subscriber data) or Update Location Answer (Update Location Answer) message, and the MME further sends the parameters to the UE.

Figure 21:
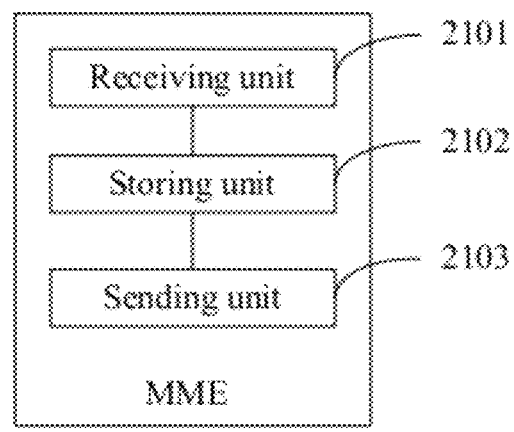
FIG. 21 is a schematic structural diagram of an MME according to another embodiment of the present invention.

FIG. 21 is a schematic structural diagram of an MME according to another embodiment of the present invention.

The MME includes a receiving unit 2101, a storing unit 2102, and a sending unit 2103.

The receiving unit 2101 is configured to receive configuration parameters used to collect terminal measurement data or a terminal measurement stop indicator sent by an IRP Agent.

The sending unit 2103 is configured to send the configuration parameters used to collect terminal measurement data or the terminal measurement stop indicator to a UE through a NodeB.

For example, the receiving unit 2101 receives a Trace Session Activation or Trace Session Deactivation message sent by the IRP Agent, where the Trace Session Activation message carries the configuration parameters used to collect terminal measurement data, and the Trace Session Deactivation message carries the terminal measurement stop indicator.

For example, when the IRP Agent sends the Trace Session Activation or Trace Session Deactivation message to an HSS, where the Trace Session Activation message carries the configuration parameters used to collect terminal measurement data, and the Trace Session Deactivation message carries the terminal measurement stop indicator, the receiving unit 2101 receives the configuration parameters used to collect terminal measurement data sent by the HSS by using an insert subscriber data (Insert subscriber data) or Update Location Answer (Update Location Answer) message; and the receiving unit 2101 receives the terminal measurement stop indicator sent by the HSS by using the Trace Session Deactivation message.

The storing unit 2102 is configured to store the configuration parameters used to collect terminal measurement data. The storing unit 2102 is optional, and the sending unit 2103 may forward the configuration parameters used to collect terminal measurement data or the terminal measurement stop indicator to an eNodeB or an RNC directly.

For example, the sending unit 2103 is configured to initiate a trace logging session specific to the user and send the configuration parameters used to collect terminal measurement data to the eNodeB/RNC by using a Trace Start message.

In another embodiment of the present invention, the sending unit 2103 may further send a terminal measurement data configuration request to the UE by using NAS signaling, notifying the UE of measuring the terminal measurement data.

In another embodiment of the present invention, the sending unit 2103 may further send a HANDOVER REQUEST (HANDOVER REQUEST) to a destination NodeB by using an 51 interface handover procedure, where the HANDOVER REQUEST carries the configuration parameters used to collect terminal measurement data or the terminal measurement stop indicator.

Figure 22:
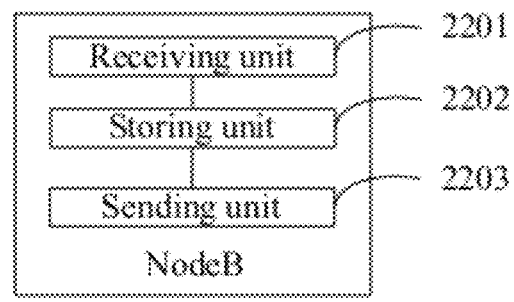
FIG. 22 is a schematic structural diagram of a NodeB according to another embodiment of the present invention.

FIG. 22 is a schematic structural diagram of a NodeB in another embodiment of the present invention. The NodeB includes a receiving unit 2201, a storing unit 2202, and a sending unit 2203.

The receiving unit 2201 is configured to receive configuration parameters used to collect terminal measurement data or a terminal measurement stop indicator sent by an IRP Agent, and receive a terminal measurement data report returned by a UE.

The sending unit 2203 is configured to send the configuration parameters used to collect terminal measurement data or the terminal measurement stop indicator to the user equipment, and send the terminal measurement data report returned by the UE to a trace data collection entity.

For example, the receiving unit 2201 receives the configuration parameters used to collect terminal measurement data sent by an MME by using a Trace Start message, sends the configuration parameters used to collect terminal measurement data to the user equipment by using an RRC Signalling message, and receives the terminal measurement data report returned by the UE; the sending unit 2203 sends the terminal measurement data report to the data collection entity.

Optionally, the receiving unit 2201 further receives a terminal measurement data configuration complete message or terminal measurement data stop configuration complete message returned by the UE.

For example, the receiving unit 2201 receives a Trace Session Deactivation message sent by the IRP Agent, where the Trace Session Deactivation message carries the terminal measurement stop indicator.

The storing unit 2202 is configured to store the configuration parameters used to collect terminal measurement data or the terminal measurement stop indicator.

In another embodiment of the present invention, the NodeB further includes a configuring unit, configured to configure the configuration parameters used to collect terminal measurement data or the terminal measurement stop indicator in a handover command when the user undergoes a handover procedure; and the sending unit 2203 sends the handover command to a destination NodeB.

Figure 23:
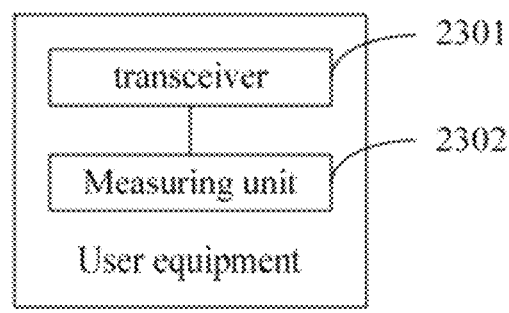
FIG. 23 is a schematic structural diagram of a user equipment according to another embodiment of the present invention.

FIG. 23 is a schematic structural diagram of a user equipment in another embodiment of the present invention. The user equipment includes a transceiver 2301 and a measuring unit 2302.

The transceiver 2301 is configured to receive configuration parameters used to collect terminal measurement data or a terminal measurement stop indicator sent by a NodeB, and send a terminal measurement data report to the NodeB.

For example, the transceiver 2301 is configured to receive a trace logging session initiated by the NodeB and the configuration parameters used to collect terminal measurement data sent by using an RRC Signalling message, and send to the NodeB a terminal measurement data configuration complete message and a terminal measurement data report which are sent to a data collection entity through the eNodeB.

The measuring unit 2302 is configured to measure the terminal measurement data according to the configuration parameters used to collect terminal measurement data or terminate measurement of the terminal measurement data according to the terminal measurement stop indicator.

According to the above technical solution, control commands of terminal measurement data configuration can be delivered, and terminal measurement data can be collected from network elements and user equipments. The collected terminal measurement data may be used to reflect the signal coverage status in an area and used as a reference for adjusting network planning and network optimization parameters.

Figure 24:
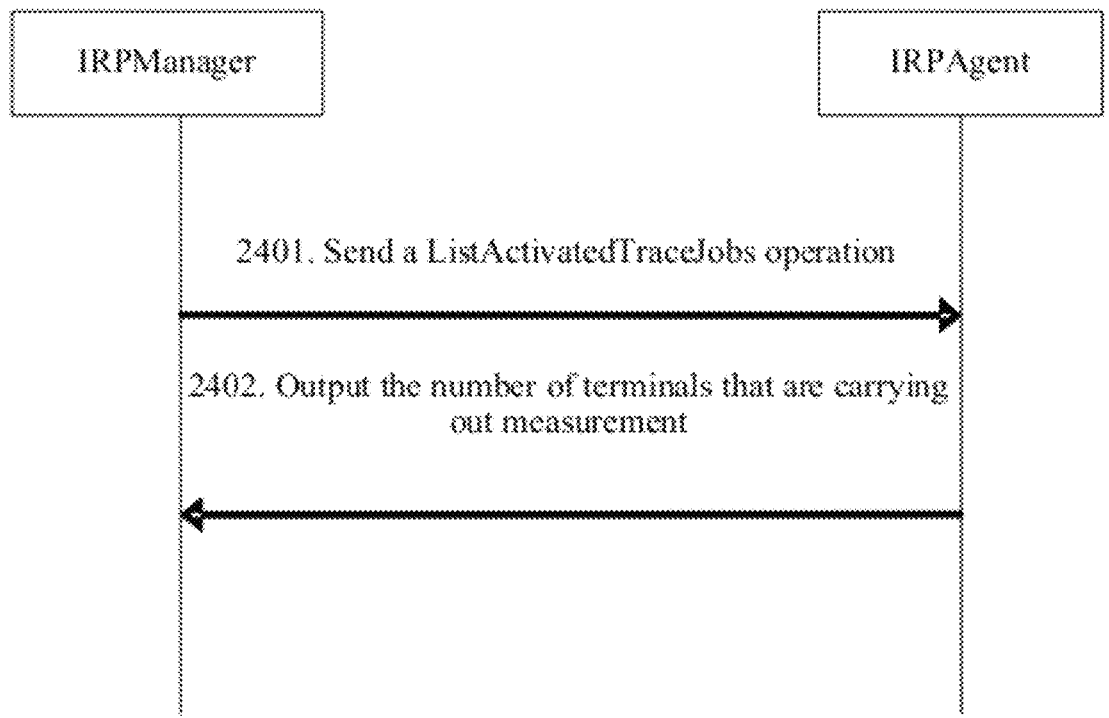
FIG. 24 is a schematic flowchart of a method for querying trace jobs according to another embodiment of the present invention.

FIG. 24 is a schematic flowchart of a method for querying trace jobs in another embodiment of the present invention.

2401. An IRP Manager sends a List Activated Trace Jobs (ListActivatedTraceJobs) operation to an IRP Agent.

2402. The IRP Agent outputs the number of terminals that are carrying out measurement.

Persons skilled in the art know clearly that, for easy and concise description, the corresponding processes in the method embodiments can be referred to for the specific working processes of the foregoing systems, devices and units, the details of which will not be described herein again.

It should be understood that the systems, devices, and methods disclosed in the embodiments provided in this application may have other implementations. For example, the foregoing device embodiments are only exemplary. The division of units is only a division of logical functions. In practice, other modes of division may be adopted. For example, multiple units or components are combined or integrated into another system, or some features may be ignored or not executed. The displayed or discussed coupling, or direct coupling, or communication connections between the devices may be implemented by using interfaces. The indirect coupling or communication connections between devices or units may be electrical, mechanical or in other forms.

The units described as separated parts may be or may not be physically separated. The parts illustrated as a unit may or may not be physical units. That is, such a part may be located in one location or distributed in multiple network units. The purpose of the technical solution of the embodiments of the invention can be achieved by using a portion of or all units described herein depending on the practical needs.

In addition, the functional units in the embodiments of the invention may be integrated into a processing unit or exist as independent physical units, or two or more units are integrated into one unit. The integrated unit may be implemented in form of hardware or in form of a software function unit.

When the integrated unit is implemented in form of a software function unit and sold or used as an independent product, the unit may be stored in a computer readable storage medium. Based on such understanding, the essence of the technical solution of the invention, or the part contributing to the prior art, or a part of or all of the technical solution can be reflected in form of a software product, which is stored in a storage medium and includes a number of instructions that instruct a computer device (personal computer, server, or network device) to execute all or a portion of steps of the method described in the embodiments of the invention. The storage medium includes all kinds of media that can store program codes, such as a USB disk, movable hard disk, read only memory (ROM, Read-Only Memory), random access memory (RAM, Random Access Memory), magnetic disk, or compact disk.

The above description is merely exemplary embodiments of the present invention, and is not intended to limit the protection scope of the present invention. Various modifications and replacements that can be easily thought of by persons skilled in the art without departing from the technical scope of the present invention should be considered falling within the protection scope of the present invention. Therefore, the protection scope of the present invention falls in the appended claims.

What is claimed is:

1. A mobile terminal comprising:
   a receiver, configured to receive from a radio communication network an instruction for collecting terminal measurement data, wherein the instruction carries a triggering condition;
   a processor, configured to collect terminal measurement data when the triggering condition in the received instruction is met; and
   a transmitter, configured to send to the radio communication network a report of the collected terminal measurement data,
   wherein the report of the terminal measurement data comprises an event type, a maximum number of measurements, and a relative time stamp for the report of the terminal measurement data.

2. The mobile terminal according to claim 1, wherein the terminal measurement data comprises data measured by the mobile terminal and related to radio communication environment of the mobile terminal.

3. The mobile terminal according to claim 1, wherein the triggering condition comprises at least one of: electrical power below a threshold, storage space below a threshold, local cell reference signal received power (RSRP) below a threshold, and neighbor cell RSRP above a threshold.

4. A computer program product, comprising computer program codes stored on a non-transitory medium, which, when executed by a mobile device, cause the mobile device to perform the steps of:
  receiving an instruction for collecting terminal measurement data, from a radio communication network, wherein the instruction carries a triggering condition;
  collecting terminal measurement data when the triggering condition in the received instruction is met; and
  sending a report of the collected terminal measurement data to the radio communication network,
  wherein the report of the terminal measurement data comprises an event type, a maximum number of measurements, and a relative time stamp for the report of the terminal measurement data.

5. The computer program product according to claim 4, wherein the terminal measurement data comprises data measured by the mobile device and related to radio communication environment of the mobile device.

6. A system on a chipset for use in a mobile terminal, comprising:
  a communication interface, configured to receive an instruction for collecting terminal measurement data from a radio communication network, wherein the instruction carries a triggering condition; and
  a processor coupled with the communication interface, configured to collect terminal measurement data when the triggering condition in the received instruction is met;
  wherein the communication interface is further configured to send a report of the collected terminal measurement data to the radio communication network, and
  wherein the report of the terminal measurement data comprises an event type, a maximum number of measurements, and a relative time stamp for the report of the terminal measurement data.

7. The system on chipset according to claim 6, wherein the terminal measurement data comprises data measured by the mobile terminal and related to radio communication environment of the mobile terminal.

8. A method for collecting terminal measurement data, comprising:
  receiving, by a mobile terminal, an instruction for collecting terminal measurement data from a radio communication network, wherein the instruction carries a triggering condition;
  collecting, by the mobile terminal, terminal measurement data when the triggering condition in the received instruction is met; and
  sending, by the mobile terminal, a report of the collected terminal measurement data to the radio communication network,
  wherein the report of the terminal measurement data comprises an event type, a maximum number of measurements, and a relative time stamp for the report of the terminal measurement data.

9. The method according to claim 8, wherein the terminal measurement data comprises data measured by the mobile terminal and related to radio communication environment of the mobile terminal.

* * * * *